United States Patent [19]
Gupta et al.

[11] Patent Number: 5,361,871
[45] Date of Patent: Nov. 8, 1994

[54] PRODUCT INFORMATION SYSTEM FOR SHOPPERS

[75] Inventors: Om P. Gupta, Ithaca; Marvin R. Clinch, Oneida; Robert C. Ricketson, Ithaca, all of N.Y.

[73] Assignee: Digicomp Research Corporation, Ithaca, N.Y.

[21] Appl. No.: 747,727

[22] Filed: Aug. 20, 1991

[51] Int. Cl.$^5$ ............................................. E04H 3/04
[52] U.S. Cl. ........................................ 186/61; 186/52; 235/383
[58] Field of Search ................... 186/52, 61; 235/383, 235/462

[56] References Cited

U.S. PATENT DOCUMENTS

| | | | |
|---|---|---|---|
| 3,836,755 | 9/1974 | Ehrat | 186/61 X |
| 4,071,740 | 1/1978 | Gogulski | 186/61 X |
| 4,569,421 | 2/1986 | Sandstedt | 235/383 |
| 4,929,819 | 5/1990 | Collins | 235/383 |
| 4,973,952 | 11/1990 | Malec et al. | 340/825 |
| 5,047,614 | 9/1991 | Bianco | 235/462 X |
| 5,065,002 | 11/1991 | Tashiro et al. | 235/383 X |

*Primary Examiner*—F. J. Bartuska
*Attorney, Agent, or Firm*—Barnard, Brown & Michaels

[57] ABSTRACT

The present invention teaches apparatus, method and use for a portable shopper product information remote unit. A plurality of remote units are provided to shoppers within a retail establishment which uses bar code scanners at a cashier's counter to record products of the shopper's purchase. The units are retrieved from each shopper subsequent to a finished purchase and returned to a central maintenance system. The remote units' batteries are recharged and data updated with at least updated pricing information such that the bar code scanners at the cashier's counters and the remote units are provided with the same updated product pricing information. The remote units include, a bar code scanning device capable of scanning bar codes, a microcomputer with database memory capable of storing and retrieving updatable product information related to each of the bar codes, a display for conveying product information, limited user-function control of the microcomputer, a rapidly rechargeable battery for supplying the unit with electrical power, and a data input device through which the database memory can be updated. Security mechanisms are provided so that these remote units can not be removed from the retail establishment by unauthorized persons.

37 Claims, 15 Drawing Sheets

PRODUCT INFORMATION SYSTEM FOR SHOPPERS

FIELD OF THE INVENTION

The present invention relates to product information systems and more particularly relates to a product information system which provides shoppers with individual product information, such as prices, without requiring retail establishments to individually price label each item.

BACKGROUND OF THE INVENTION

The need for individual package price labels for products sold in supermarkets is currently a significant issue. Almost all products sold today are factory labeled with a uniquely identifying UPC (Universal Product Code) bar code. When scanned at a supermarket checkout station this initiates an automated retrieval of price from an in-store computer database. Industry spokespersons claim that this form of checkout system virtually eliminates the need, and the associated labor costs, for additional price labeling of individual packages, the cost savings resulting in lower prices to the consumer. Furthermore, they claim, the consumer is still provided adequate pricing information in the form of a label on the shelf where the product is displayed.

On the other hand, consumer advocate groups claim that eliminating individual price labeling is unfair to the consumer because the price stored in the checkout counter computer database may be higher than that listed on the shelf label. Studies have found that discrepancies between the shelf labels and the price stored in the checkout counter computer database are frequent. A price label on the package has been the only previous practical means by which shoppers can verify that they are being charged the price they expect at the checkout station.

Even if products are labeled individually, discrepancies may still exist between prices in the checkout counter computer database and on individual pricing labels. This is especially true for competitive, high-voltage supermarkets where prices change weekly, or more frequently, in response to product availability and promotional sales. The time required to update shelf and individual price labels is clearly much greater than that required for the simple keyboard entries needed to update the computer database. In the interim, price discrepancies will still exist.

If an individual product pricing method were to display to the shopper the price currently in the checkout counter database, there would be no discrepancies. In addition, if this method could provide shopper readable individual product pricing information without requiring physically affixing price labels, it would provide industry its desired labor cost savings without depriving shoppers of their desired pricing information.

When bar code scanners were first introduced, some supermarkets provided bar code scanner aisles for customers to use by themselves, before going through the actual checkout counter. Portions of a transcript from "A Joint Public Hearing Into The New York State Item Pricing Law", discusses this practice and the problems associated with it. In this hearing, the president of Price Chopper Supermarkets, Neil Golub, testified that "[Providing a sample scanning device for customer use only] was done for years. Remember, scanning has been around for many years now and when we first opened scanning stores, the way to interchange with your customers was to provide a scanning unit so that they could try the items and develop a credibility with the system." However, this system did not provide the customer with access to the store database while the shopper was comparing individual items during shopping. The shopper would still have to remember what the shelf price was until he or she walked over and gained access to a test scanning unit. The disadvantage from the establishment point of view was that if the shopper decided not to purchase the product after seeing the price, the shopper would often not return the product to its proper place in the store shelves. Heretofore, apparatus and method for providing a shopper immediate and direct access to a store database of product information while shopping has been unrealized.

Some patents teach bar code readers for business applications. U.S. Pat. No. 5,023,438, given to Watatsuki et al. entitled "A portable data input apparatus with different display modes" which teaches a pen type bar code reader that can invert the display message on the display device in response to an appropriate detection signal. Wakatsuki also teaches the implementation of a small transmitter/receiver exchanging messages with a data processing device. U.S. Pat. No. 5,012,642, given to Chadima et al, entitled "Instant portable bar code reader" teaches a bar code reader system that provides a hand held bar code reader attached to a power unit and a processing unit that can be constructed to be portable. U.S. Pat. No. 4,766,299, given to Tierney et al, entitled "Hand-mounted bar code reader" teaches a bar code reader that fits on a user's hand and allows the user to use that finger and all others of that hand for other purposes such as using a cash register. U.S. Pat. No. 4,818,847, given to Hara et al, entitled "Apparatus for optically reading printed information" teaches a new embodiment for a bar code reader. U.S. Pat. No. 4,983,818, given to Knowles, entitled "Data acquisition system with laser scanner module" teaches that a light scanner device might include a removable data terminal wherein the data terminal can be downloaded with new information and instructions from a host computer. U.S. Pat. No. 5,019,694, given to Collins, entitled "Overhead scanning terminal" teaches an overhead bar code scanning terminal for use at a checkout counter in a retail store. U.S. Pat. No. 3,978,318, given to Romeo et al, entitled "Hand-operated scanner" teaches a bar code reader that fits on a user's finger and allows the user to use that finger and all others of that hand for other purposes such as using a cash register.

Each of the patent publications listed above, fail to teach apparatus, method or use for a bar code reader, data manipulation and display capability, that insures current, accurate product information systems for use by shoppers. Heretofore, a simple and attractive solution to the individual pricing problem for both industry and consumer has not been developed.

SUMMARY OF THE INVENTION

It is, therefore, the primary object of the present invention to provide a product information system which provides shoppers with information concerning individual products on the shelves without requiring retail establishments to individually price label each item.

It is a further object of the present invention to provide a product information system which provides shoppers with portable remote units which read bar codes and insures that the shopper and cashier counter are provided with the same product pricing information.

It is a further object of the present invention to provide a product information system which provides shoppers with portable remote units which read bar codes and insures that the shopper and cashier counter are provided with the same product pricing information such that the product information system is economically and easily maintained.

It is a further object of the present invention to provide a maintenance system which economically and efficiently recharges the batteries and updates the product information in the portable remote units which read bar codes and insure that a shopper and cashier counter are provided with the same product pricing information.

It is a further object of the present invention to provide a product information system which provides shoppers with portable remote units which read bar codes and store a list of information for products to be purchased such that the shopper and cashier counter can compare product pricing information and the total cost of the purchase so that any discrepancies between the totals in the remote units and in the cashier counter would be easily identified.

It is a further object of the present invention to provide a product information system which provides shoppers with portable remote units which include means for insuring that the remote devices will not be removed from the premises.

One of the discoveries of the present invention is a product information system for providing a shopper with current, accurate information on individual products within a retail establishment which uses bar code scanners at cashier's counters to record products of said shopper's purchase. The product information system comprises: a plurality of portable product information remote units to be provided for shoppers which are capable of reading bar codes, a data update system for updating the remote units with updated product information related to each of the bar codes, and means for supplying the data update system with updated product information, including pricing information, such that the bar code scanners at the cashier's counters and the remote units are provided with the same updated product pricing information.

The remote units can be provided with means for securing the unit such that the unit can be easily used by shoppers, but can only be removed by agents of the retail establishment. Means are also provided for assuring the units are not removed from the retail establishment in an authorized manner. The remote unit can include a rapidly rechargeable battery and an external connection mechanism such that the remote unit is updated with product information and the rechargeable battery is rapidly recharged as the unit is stored in a staging area. The staging area can also include means for assuring that the units are updated before being used again. The system can also include means for comparing a product information list of items to be purchased accumulated by the shopper with a corresponding list recorded at the cashier's counter to resolve any discrepancies in the purchase information.

These and other objects, features and advantages of the present invention should become apparent from the following description when taken in conjunction with the accompanying drawings.

DETAILED DESCRIPTION OF THE PREFERRED EMBODIMENT

Figure 1:
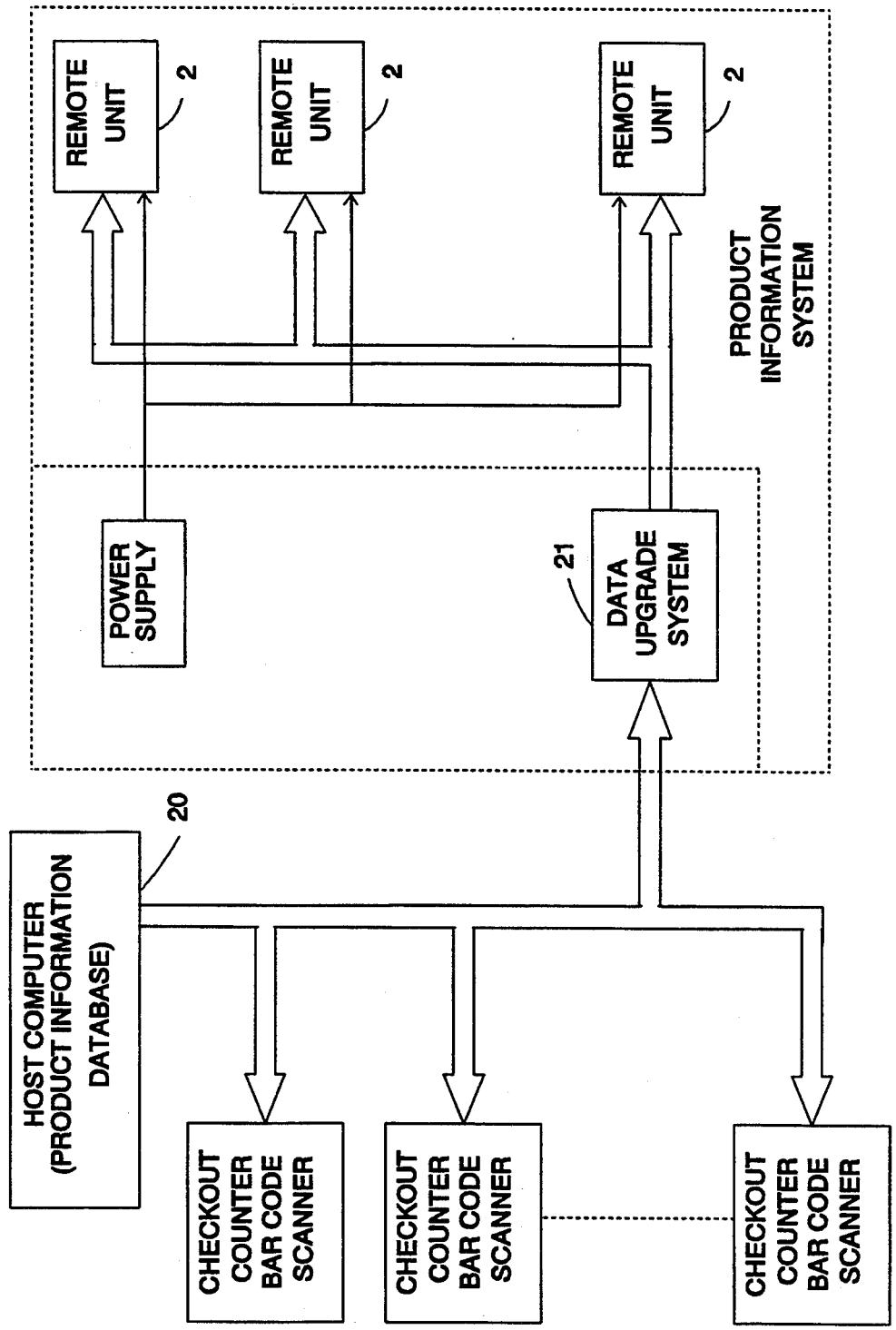
FIG. 1 is a block diagram of a shopper product information system as taught by the present invention.

For the purposes of promoting an understanding of the teachings of the present invention, references will now be made to the embodiments illustrated in the drawings and specific language will be used to describe these embodiments. It will nevertheless be understood that no limitation of the scope of the invention is thereby intended, alterations and further applications of the teachings of the present invention as illustrated and described hereinabove is anticipated by those skilled in this art.

The major cause of discrepancies between prices in the computer database and on shelf or individual pricing labels is the inherent inability to update all pricing information sources concurrently. This is especially true for competitive, high-volume supermarkets where prices change weekly, or more frequently, in response to product availability and promotional sales. The time required to update shelf and individual price labels is clearly much greater that required for the simple keyboard entries needed to update the computer database. In the interim, price discrepancies must exist.

Stores could provide a number of scanner units around the store where shopper's can bring products to read the prices. The trouble with this approach is several fold. One, it still leaves a doubt in the shopper's mind that he or she is not being told a different price than the one that will be charged at the checkout counter. The other problem is that if the customer does not like the product after reading its price, he or she is unlikely to replace it on the shelf from where he or she picked it up.

The present invention teaches apparatus, method and new uses for apparatus that provide a simple, efficient and attractive solution to the individual pricing problem for both industry and consumer. The present invention teaches providing individual shoppers with microprocessor units that can scan the bar codes, display the product prices and other derived information and allows manipulation of information such as keeping a list of item's purchased, the total cost, sales tax, etc. The shopper can carry this unit around with him or her through the store. At the end of shopping the shopper goes to the checkout counter where the purchased items are registered by the sales clerk using bar code scanners. The present invention also teaches that after shopping the shopper's unit is retrieved from the shopper. The shopper's unit is then returned to a staging area. The shopper unit's power is recharged and product information is updated while waiting in this staging area, waiting to be picked up by the next customer.

The present invention teaches that the shopper's unit as well as the checkout counter terminal work from the same product information database so that the shopper get's the most current prices of each product, thus eliminating the present controversy. Each shopper's unit further aids the shopper by keeping a list of and running total of his purchases, a feature particularly useful to those living on a limited budget. However, the possibility of error still exists between the running total in the shopper's unit and the total cost asked for by the sales clerk as the shopper may pick up items without registering in the system. Therefore a mechanism is also provided to automatically retrieve the list from the shopper's unit at the checkout counter comparing the two and resolving the differences. The cashier and the shopper could be provided with a printout of the differences and reexamine the purchase to reconcile the purchase information.

The shopper's units could be mounted on shopping carts or hand held units that can be carried by each shopper. The hand held portable units are more desirable by shopper who carry a basket for purchasing a few items only. However, portable units have a higher risk of being dropped and broken. Since the shopper's units are expected to be a valuable items, means are provided that they can not be taken out of the store. Some local laws require that stores display each item price on the shelf. The present invention teaches the use of one such shopper's unit, along with a printer, to produce labels that can be appropriately put on the shelves displaying the current product prices.

As used hereinabove, the term "portable" means any unit which is capable of being moved about a retail establishment either by a shopper carrying the unit or by connecting the unit to another apparatus (e.g. a shopping cart) which is moved about the establishment by the shopper. As used hereinabove, the term "remote unit" means a unit that is provided to a shopper and stands alone, in that it is not physically connected to any other system when being used by a shopper, however, each unit is operatively connected to the product information system by the frequent use of the data update system.

Product Information System

The pricing method of the present invention displays to the shopper the most recent prices in the cashier's counter computer database, therefore there are no discrepancies. In addition, this method provides individual product pricing information without physically affixing price labels, so the industry has its desired labor cost savings without depriving shoppers of their desired services. As shown in FIGS. 1-13, a dedicated portable microcomputer designed to provide the customer on the supermarket floor the ability to scan the bar codes on product packages and to display the database price for the item scanned, is taught herein.

As shown in FIG. 1, the present invention teaches a product information system for providing a shopper with current, accurate information on individual products within a retail establishment which uses bar code scanners at cashier's counters to record products of the shopper's purchase. The product information system includes a plurality of portable remote product information units to be provided for each of the shoppers within the establishment who desire access to the product information. The product information system also includes a data update system capable of operatively associating with the data input device in the remote unit and updating them with updated product information related to each of the bar codes. The remote units are removable from the data update system for use by the shopper, and are restorable on the data update system after use by the shopper so as to be updated with the updated product information. The data update system is connected to means for supplying the data update system with updated product information, including product pricing information, such that the remote units are provided with the same updated product pricing information as provided at the bar code scanners at the cashier's counters.

The function of the product information system is to control and to maintain a number of portable customer-utilized, remote units which feature means to read the UPC bar code on product packages, to display information about the product, in particular price, and to perform customer-selected manipulations of the stored data. The remote units are portable in that they may be permanently attached to shopping carts which can be wheeled around the store by the shoppers directly. The units are also remote in that a copy of the supermarket's current product information database is stored in memory within each remote unit such that it can be operatively connected to other system elements, yet still be independent of constant physical connection by wires or other means of continuous communication with external devices.

An intermediate computer can interface with an existing supermarket host computer. Whenever a change occurs in the host computer's database, a current copy of the host's product information database is automatically supplied to the intermediate computer. The same host computer controls the database used by the checkout counter terminals. The use of an intermediate computer allows the conversion of the copy of the host's database into a standard format database suitable for storage in the memories of the remote units. The intermediate computer sends data and control signals to a central maintenance system where the remote units are temporarily stored between periods of use by shoppers.

Remote Units

Figure 2:
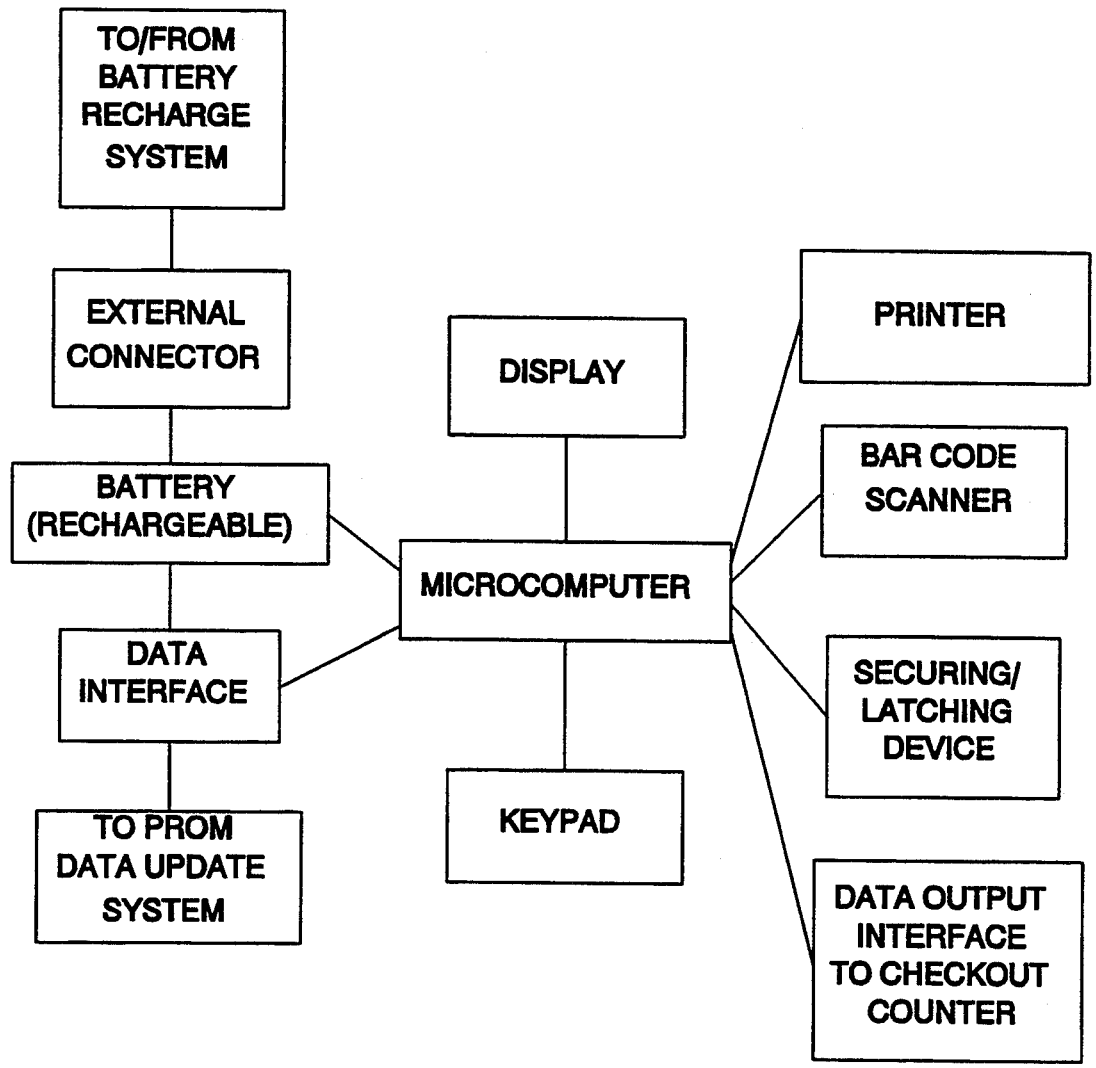
FIG. 2 is a block diagram of the remote unit operation as taught by the present invention.

In every embodiment of the present invention, the product information system will include a plurality of portable remote product information units to be provided for each shopper, who desires access to product information, as shown in the block diagram of FIG. 1. As shown in FIG. 2, each of the remote units includes: 1) a bar code scanning device capable of decoding bar codes on individual products, 2) a microcomputer with database memory capable of storing and retrieving updatable product information related to each of the bar codes, 3) means for displaying the product information to the shopper, 4) means for providing the shopper with limited user-function control of the microcomputer, including manipulation of selected product information, 5) means for supplying the unit with electrical power, and 6) an input device through which the database memory can be updated.

Figure 3:
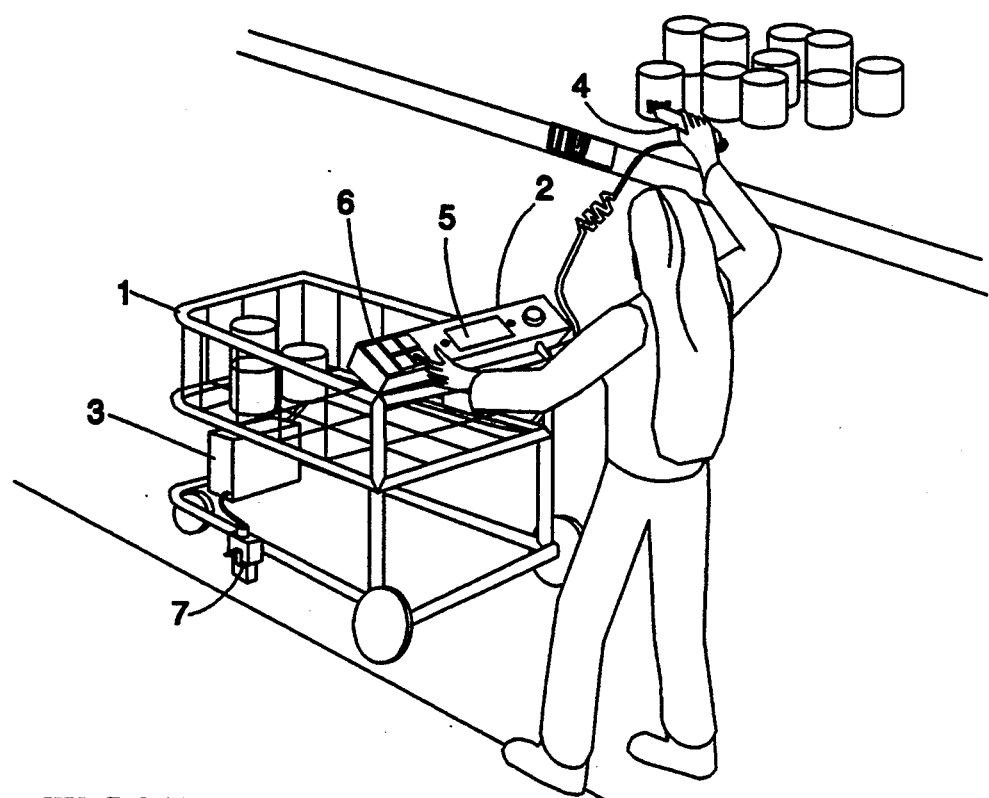
FIG. 3 is a perspective view of a shopper using a shopping cart including a shopper product information remote unit as taught by the present invention.
Figure 4:
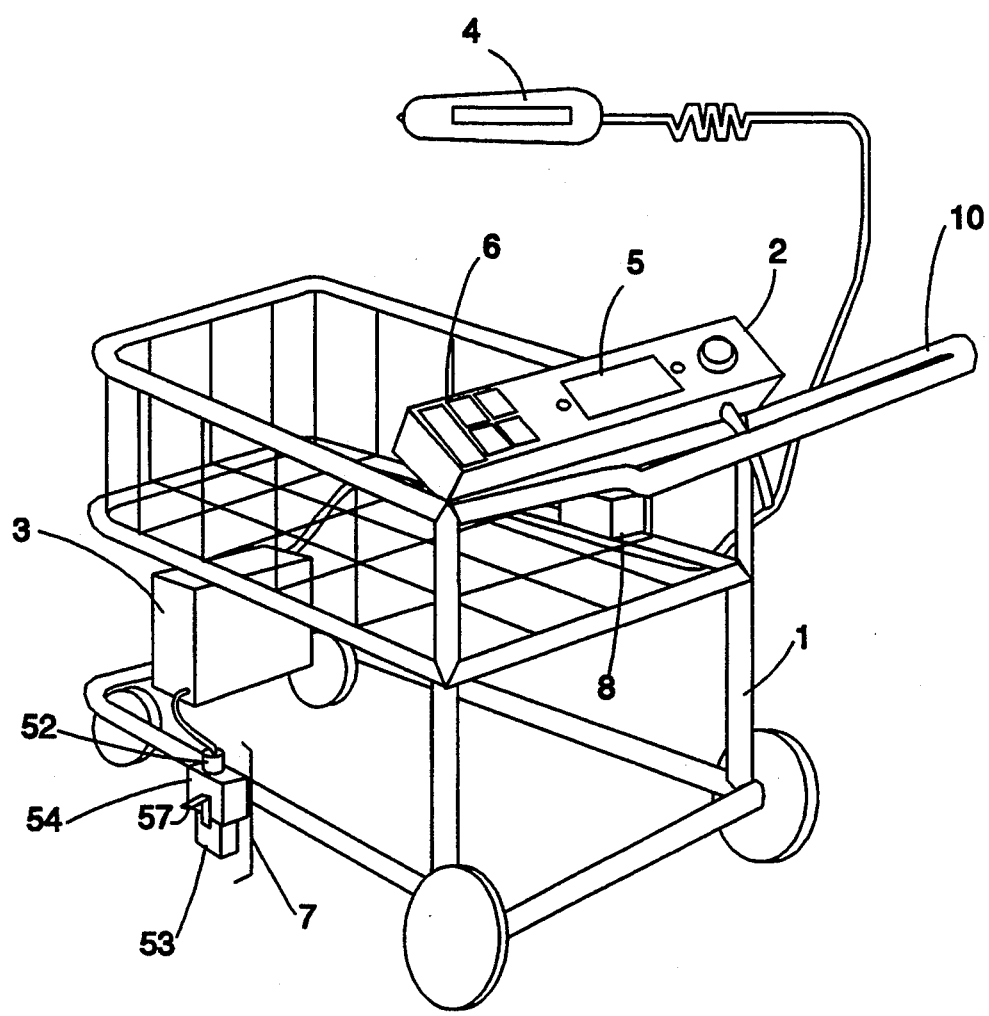
FIG. 4 is a perspective view of a shopping cart including a remote unit as taught by the present invention.

FIG. 3 shows a shopping cart 1 including a shopper product information remote unit 2 and a shopper obtaining product information as taught by the present invention. As shown in FIG. 4, the key functional elements of the remote unit 2 include a single-board microcomputer with database memory 3, a bar code scanner 4, a display 5, a keypad 6 for function control, a rapidly rechargeable battery power pack (located within the microcomputer 3, and an external connection mechanism 7 through which the remote unit may be recharged, and a data input device 8 through which the database is updated when the remote unit 2 is not being used by a shopper. The remote unit 2 can include a rechargeable battery 9 which can be recharged through the external connection mechanism 7.

Future legislated requirements or optional capabilities for product information to be displayed could be readily handled by the computer via reprogramming. For example, the remote units 2 could display information on sales tax, deposits, unit pricing for comparison shopping, etc., as well as package price. Additional product data, such as nutritional information, could be displayed and processed by the same units when it becomes available in the database and the units are reprogrammed to retrieve it.

The remote unit 2 can be packaged in a rugged, injection-molded polycarbonate case sealed against environmental hazards, such as spilled containers, and designed to be permanently attached to a shopping cart 1 at a point convenient for the customer, such as near the handle 10. Since there might be a significant risk of expensive damage or theft for remote unit-equipped carts 1 outside the store, those carts 1 could be mechanically restricted to remain inside. Purchases removed from the cart 1 at the checkout station would be transferred, after bagging, to a different cart which could be taken to the store's parking area.

Figure 5:
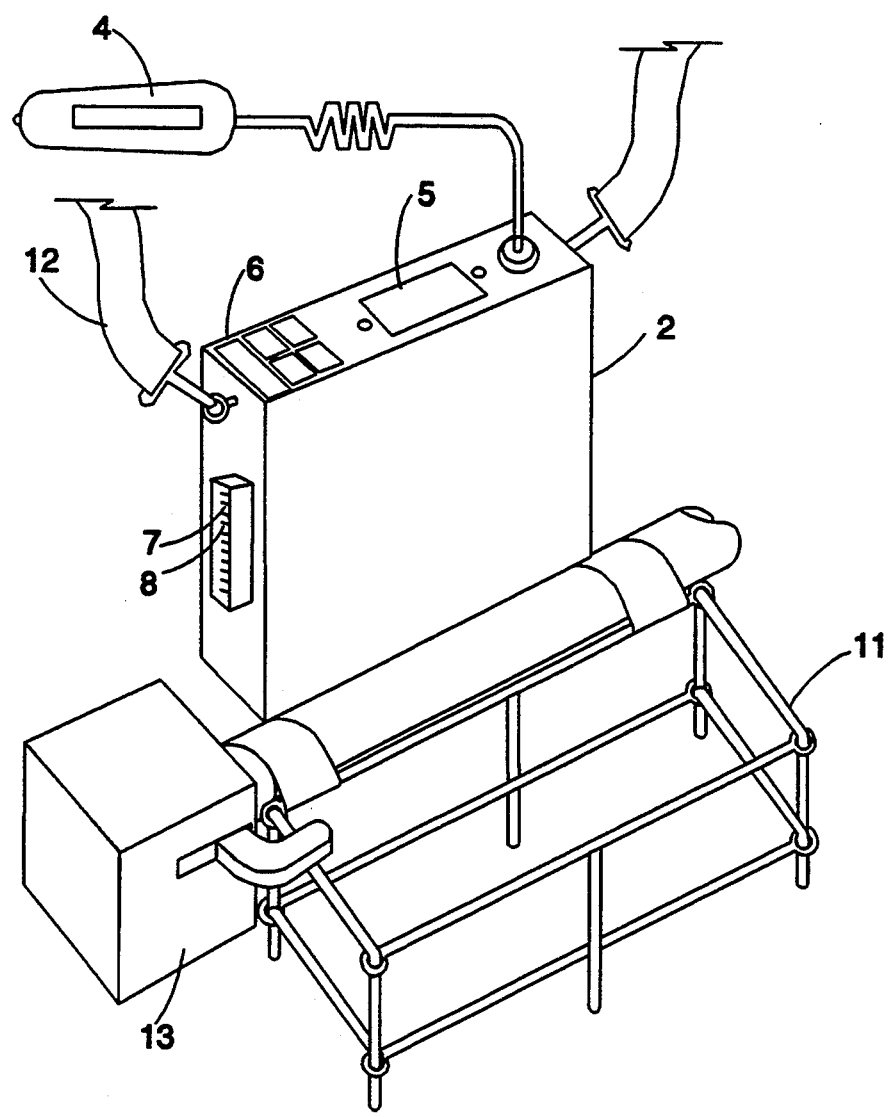
FIG. 5 is a perspective view of a shopping cart including a removable remote unit as taught by the present invention.

FIG. 5 shows a shopping cart 1 which includes a remote unit 2 which can be latched to the side of a cart 1 when requested by the shopper. In this case the unit 2 would be retrieved from the cart 1 at the checkout station before the cart 1 were taken out of the store, eliminating the need for cart restrictions. The possibility of damage to the unit 2 if the customer or the checkout clerk should drop it and the greater potential for theft of the unit 2, by itself easily concealed, makes the risk of loss for this embodiment greater than that if the unit 2 is permanently attached to the cart 1.

A cart mounted holding rack 11 can be provided such that the unit 2 could be securely held on the side of the cart 1 during use. A carrying strap 12 is also shown, so the removable unit 2 could be carried by a shopper who just needs a few items. The strap 12 also helps reduce the chance of the unit 2 being dropped. Furthermore, the unit 2 could be locked into the holder 11 by a lock 13 and unlocked and removed by a cashier, thereby reducing the chance of theft. This lock could be either electronic or mechanical. If the lock were electronic, it could be deactivated by an IR device at the checkout counter so the cashier could remove it. The holder 11 could be collapsible such that the presence of unit 2 would hold it open, but after removal of the unit 2, the holder could be collapsed and out of the way. If the holder 11 were provided on the side of the cart 1 the store could provide doors with rail systems such that the carts 1 with units 2 in the holders 11 would be too wide to exit, but carts 1 with collapsed holders 11 could pass through.

Figure 6:
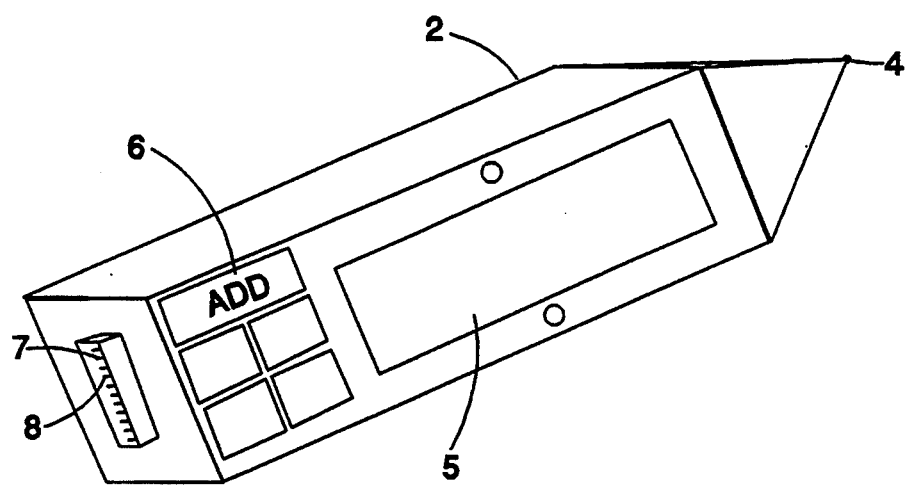
FIG. 6 is a perspective view of a shopper-carried remote unit as taught by the present invention.

FIG. 6 shows a shopper carried remote unit 2. While the features would be physically much smaller in scale, the remote unit 2 would be similar to the other embodiments described hereinabove and the unit 2 would still include the data input device 8 as taught by the present invention. This type of unit 2 would be more convenient for the shopper, but the ease of theft is a major concern with this type of embodiment.

One difference in the configuration of the shopper carried units are the use of standard electrical connectors as the external connection mechanism 7 and data input device 8. The connectors may provide a more reliable connection for data transfer. The intention for the shopper carried units 2 is that they be returned to the checkout clerk by the shopper. Shopper carried units 2, although potentially much simpler to incorporate in the existing supermarket environment, would be much more susceptible to damage and theft than cart-mounted units 2. The damage potential can be reduced by rugged packaging and careful handling by store personnel.

Possible embodiments of the components of the remote units 2 are described in detail below.

Remote Units—Bar Code Scanner

The bar code wand 4 can be selected from a variety of rugged commercial units which include the circuitry to read and translate the interleaved 2 of 5 UPC bar code independent of the microcomputer CPU 3. While the UPC system is generally used, other systems of bar code identification are certainly within the scope of the present invention. The wand can signal the microcomputer CPU 3 that a new bar code has been read either automatically or via a button that the user presses just before reading the bar code. A sapphire tip on the wand 4 protects the internal light-sensitive elements from dirt and debris. The wand 4 is connected to the unit 2 through a strain-relieved coil cord such that the shopper can bring the wand tip in contact with the bar code on the product as it sits on the shelf. A spring loaded retraction mechanism could be provided such that the wand 4 would not be damaged if it was allowed to dangle from the unit 2. A cord of six to eight feet should provide the shopper with adequate reach. Bringing the wand 4 to the product is believed to be superior to the alternate reading method whereby the product would be brought to a laser bar code scanner mounted in the remote unit case. Wireless hand mounted units as taught by Wakatsuki could also be used as scanning device 4 in the remote units 2. However, such units are likely to create interference with similar bar code scanners used by other shoppers. In any event, all these methods of implementation of the teachings of the present invention are anticipated depending upon user preference.

Remote Units—Microcomputer

The single-board microcomputer 3 can be based on an 8-, 16- or 32-bit CPU (central processing unit) architecture and incorporates proven, readily available commercial hardware. Addressing capability will be adequate to handle up to 16 megabytes of on-board RAM (random access memory) in which the product information database will be stored. Memory storage can be provided by any technology (e.g. disk drive storage) that is adequate for the purposes described herein. It is estimated that the 16 megabyte capacity would provide ample memory for a typical supermarket application.

Although the database stored in the remote unit 2 will be detached from the master database in the supermarket's host computer 20, it will be updated anytime the remote unit 2 is in its storage area, not being used by a shopper. Updating will be accomplished in a few seconds and will be performed an adequate number of times per day to insure that the remote unit's data is current with the host computer's data.

The normal practice is to change items prices when the store is either closed or most likely to have the least shoppers, which is typically between 12:00 and 4:00 am. However, there is still a possibility that the host's database is updated while some remote units 2 are being used by shoppers. This problem is resolved by associating a version number with each database version. The checkout counter can retrieve the shopper's database version from his or her unit 2, and determine if there have been some changes, and inform the shopper of any such changes before the purchase is completed.

Additional hardware on the single-board microcomputer 3 includes a display driver and serial communications devices to handle both input from the bar code scanner 4 and database update inputs from the external connection mechanism 7. A parallel communications device handles inputs from the keypad 6, and it has the capability of handling outputs to peripheral devices, such as a 40-column printer, which may be incorporated in some embodiments of the remote unit 2. An 8 kilobyte replaceable ROM (read only memory) should be adequate to store the unit operating program, however, as functions of the unit 2 expand appropriate modifications in hardware design are certainly anticipated.

Source programming for the pricing computer is effectively accomplished in Ada or Pascal programming language. These higher-level languages are ideal for the pricing-computer application because of the flexibility in the types of data structures they allow the programmers to define. There should be no difficulty adapting the operating program to handle a wide variety of pricing database structure already in use by various vendors.

Figure 7A:
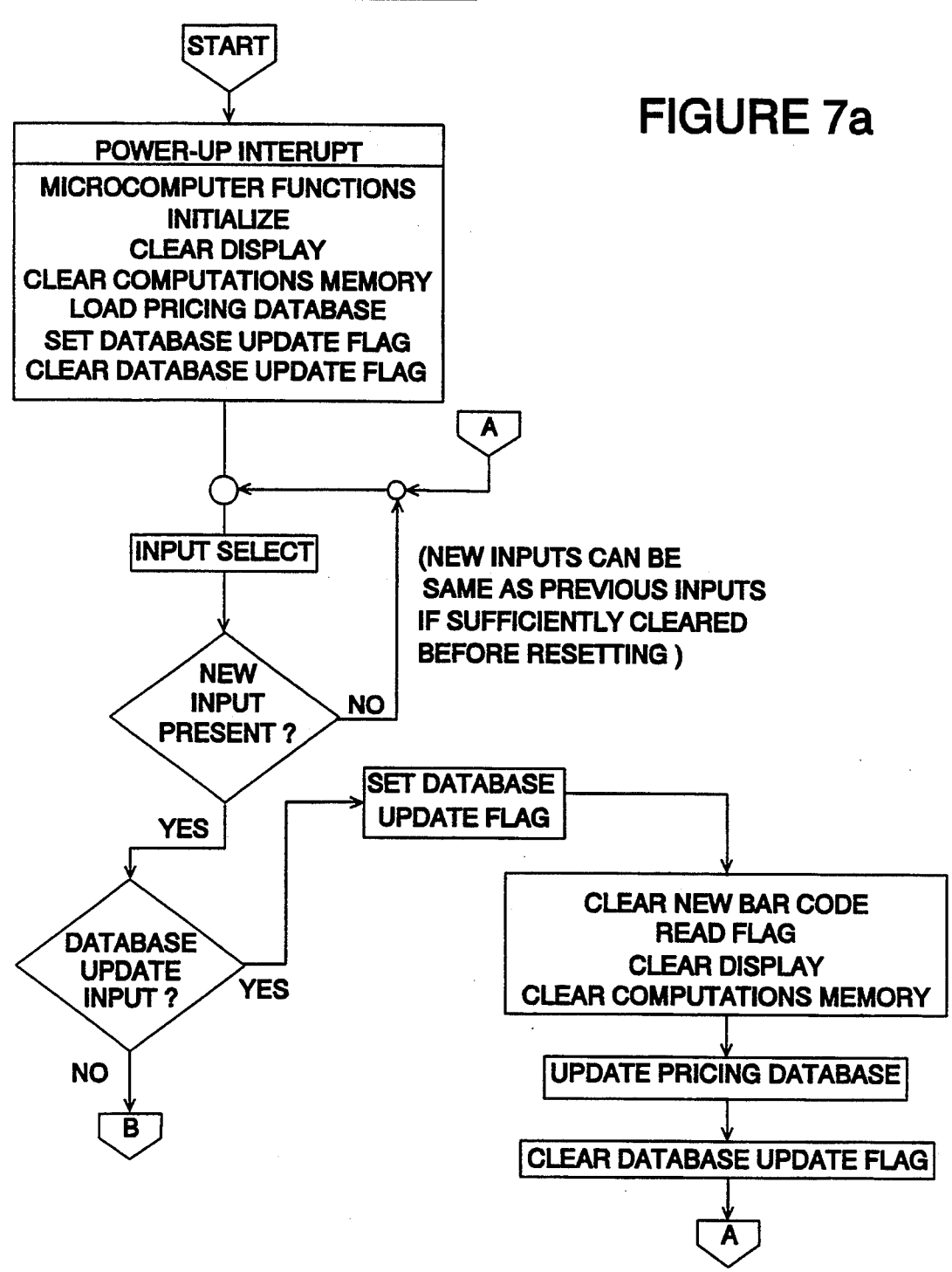
FIGS. 7a-7c are a series of flow charts for the remote unit operational program.
Figure 7B:
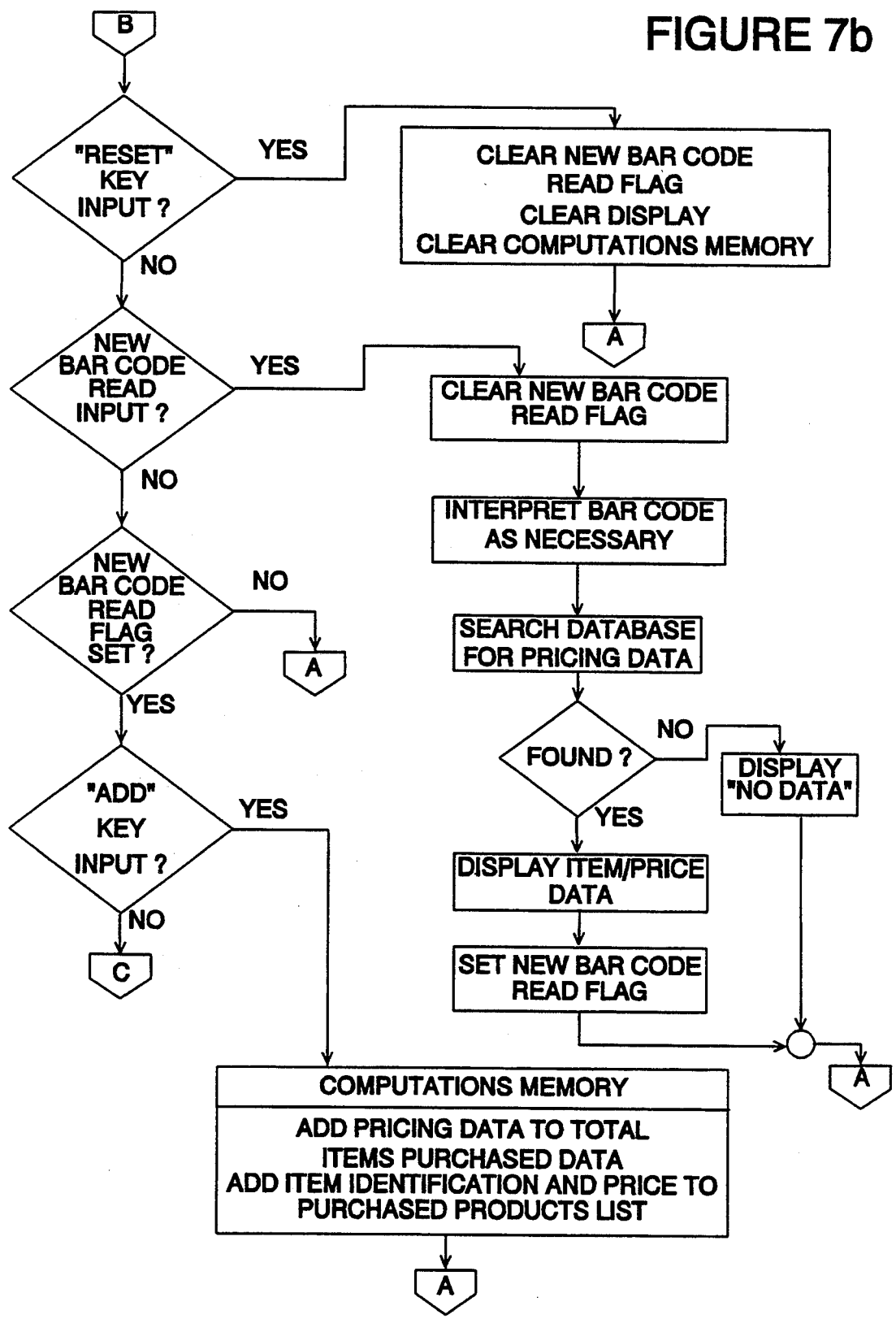
Figure 7C:
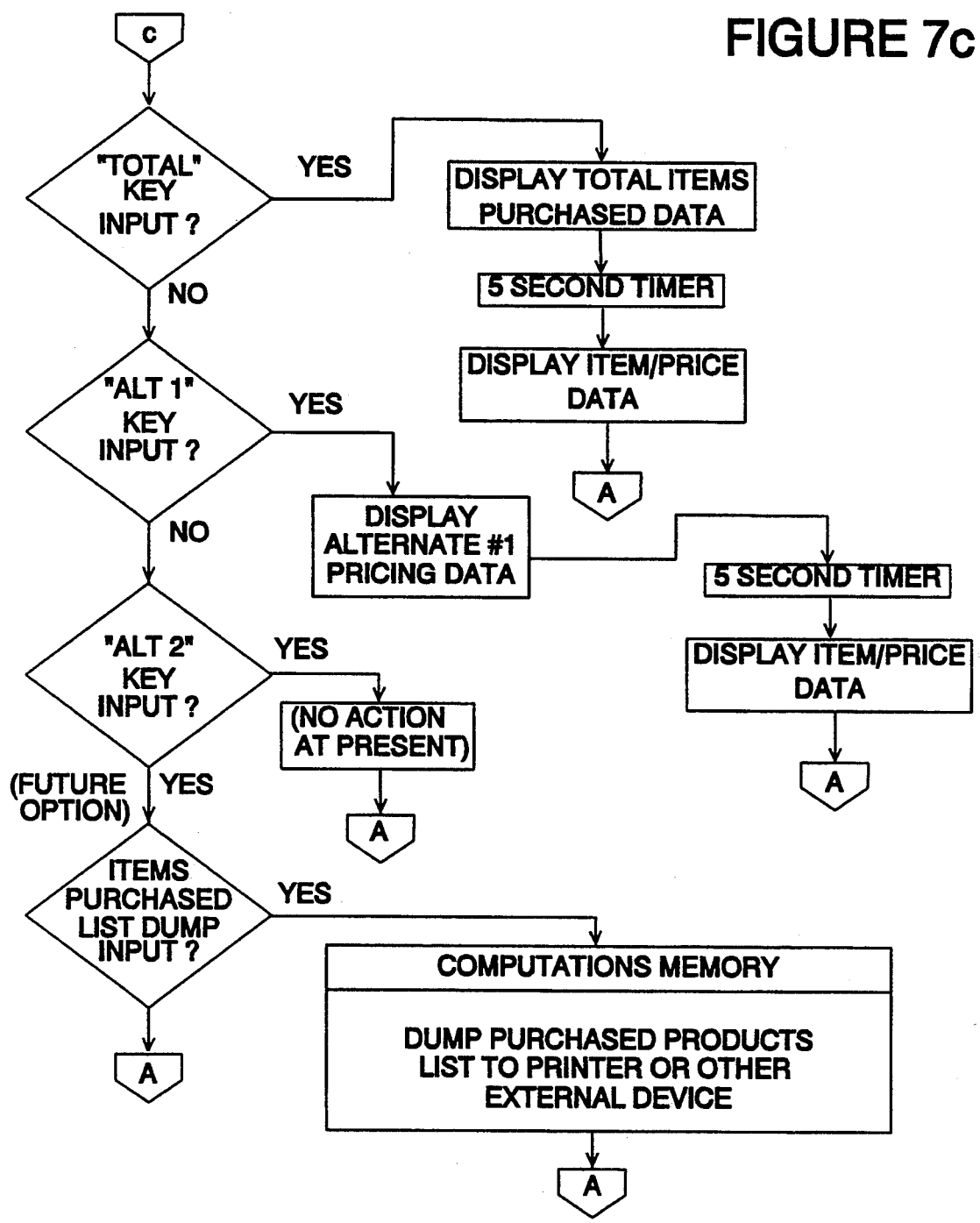

FIGS. 7a–7c show a series of flow charts for one possible remote unit operational program. As user-needs develop, new program operations will be developed by those skilled in the art. When the shopper first starts to use the remote unit 2 the operational flow of the program is initiated. Intermediate data storage, the results of computations associated with customer selected functions and a sequential record of the customers purchases are stored in the computations memory, a dedicated section of RAM, which is cleared and preset to zero when a new customer resets the program. A "DATABASE UPDATE FLAG" provides a signal for illuminating the database update indicator on the display panel when new data is incoming. A "NEW BAR CODE READ FLAG" is set only when valid product information has been retrieved from the on-board database. This protects the program from further action on non-existent data in case where data for the bar code read is not stored. The "DATABASE UPDATE INPUT" is derived from a signal via standard serial data connectors or via IR communications, and it causes the program to branch to a service routine for accepting a string of update information. The "ITEMS PURCHASES LIST DUMP INPUT" is a similar signal which causes the program to branch to a service routine that outputs a string of purchased products list data via either serial connection or IR transmission.

A power-up interrupt procedure begins which initialize's the microcomputer 3 functions, clears computations memory, clears the display 5, set a database update flag, loads a pricing database and clears the database update flag. The unit 2 is then ready to receive input. If database update input is incoming then the database update flag is set and the new bar code read flag, the display and the computations memory are cleared. The remote unit 2 pricing database is updated and the database update flag is cleared. The unit 2 is then ready to receive new input (A).

If the new input is not database input (B), the "Reset" key is sampled. If the "Reset" key is pressed then the new bar code read flag, the display 5, and the computations memory are all cleared, and the unit 2 ready to receive new input. If new bar code input is received the new bar code read flag is cleared, the bar code is interpreted as necessary and the database is searched for product information. The information is then displayed and the new bar code read flag is set. In the event that no data for the bar code is found in the database a "no data" message is displayed. When the new bar code flag is set, the "add" key is sampled. If the "Add" key is depressed the pricing data is added to the total items purchased data and the item identification and price is added to the purchased products list. If the "total" key is depressed (C), the total items purchased data is displayed for about five seconds. The "total" data after power-up interrupt or "reset" and before "add" is numerically zero. If the "Altl" key is depressed the alternative #1 product information is displayed for about five seconds. Alternative #2 product information can be displayed as the use of the remote units expands.

Remote Units—Display

Figure 8:
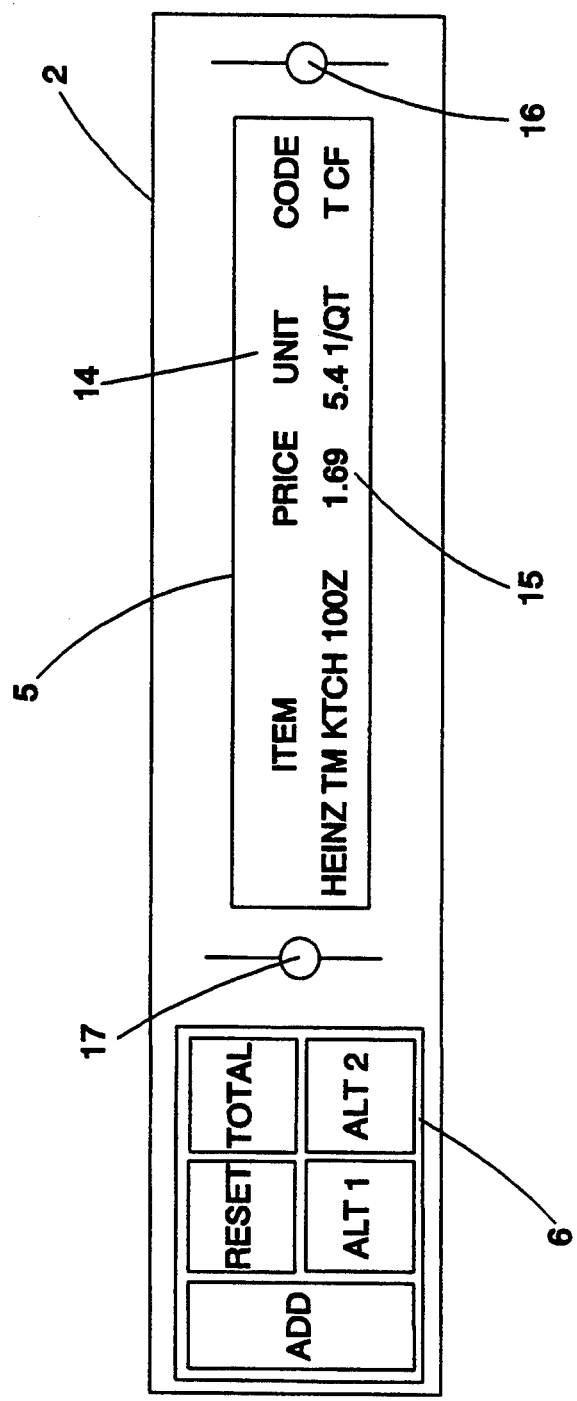
FIG. 8 is a front view of the display on one embodiment of a remote unit as taught by the present invention.

FIG. 8 is a front view of the display on one embodiment of a remote unit 2 as taught by the present invention. The display 5 shown is a low-power LCD (liquid crystal display) data display 5. The LCD display 5 is mounted inside the top of the unit 2 case and consists of two lines of up to forty characters each. The upper line 14 displays the identification of the data displayed below it, labels centered on their respective data fields. The lower line 15 displays the data in large 16 or 18 point characters such that the shopper can read them from a distance. By including the data labels 14 in the display, a virtually unlimited number of different display formats can be presented. A light level sensor 16 mounted in the unit 2 case near the display 5 detects low ambient light conditions and automatically turns on edge lighting for the display such that the shopper is still able to read it when entering a dark area of the store. A database update indicator 17 is provided to indicate that the database has been updated.

Remote Units—User-Function Control

As user-needs develop, the desired user function control will change with those needs. Described herein is one possible implementation of many possible user-function control systems. The membrane keypad 6 is mounted on the top of the unit 2 case near the LCD display 5 and is of a rugged sealed construction similar to that of membrane keypads used in industrial machine-tool controllers. The keys are comfortably large and have a feel that definitely indicates to the user that the key has been depressed. The keypad configuration in the embodiment of the unit 2 shown has five keys, one large key and four smaller keys, each half as tall as the large key, arranged in a square just to the right of the large key. Identification of the keys and the program functions correspond.

The small key in the upper left corner of the square is the "RESET" key. This key is pressed by the shopper when he or she first starts to use the remote unit 2. Or, the reset would be done automatically when the unit 2 is placed in the central maintenance system. It clears memory sections where the results of computations, such as a running total of purchases, for the previous shopper have been stored. When a new bar code has been read, the LCD display 5 presents a product description of up to nineteen characters (c.g., "HEINZ TM KETCH 100Z"). This is followed on the same display 5 with a package price of up to seven characters (e.g., "1.69" or "2/2.99"). The package price is followed by a unit price of up to eight characters (e.g., "18.80/LB" or "5.41/QT"). Finally, the unit price is followed by a code of up to three characters indicating whether the product is taxable ("T"), requires a deposit on the container ("D") or is covered by a current discount coupon "C"). If the shopper wishes to see more information about tax, deposit or discount the small "ALT1" key in the lower left corner of the square should be pressed to present the first alternate data display. The tax without discount, deposit, discount and tax with discount for the package is presented, in order, across the display. After approximately five seconds the display reverts to the original display of product description, package price, etc. If the shopper wishes to purchase the package the large "ADD" key should be pressed. This action causes the package price, tax, deposit and discount data to be added to running totals stored in the computer memory. The "ADD" key is the large key because it is used most often and generally can be reached from a distance while the shopper is using the other hand to place the package into the shopping cart. If the shopper wishes to review the current running totals the small "TOTAL" key in the upper right corner of the square should be pressed. This action causes the LCD display to present useful running totals. Up to five characters each of total taxes without discounts, total taxes with discounts, total package deposits and total discounts are presented in that order. This will be followed in the same display with up to six characters for each purchases with taxes deposits and total purchases with discounts, taxes and deposits. After approximately five seconds the display reverts to the original display of product description, package price, etc.. The small key in the lower right of the square is the "ALT2" key, which can be given function in alternative embodiments of the remote unit 2. It is available to be used for calling up additional data displays as pricing databases are expanded. Because there are a large number of combinations of the "ALT1", "ALT2" and other keys which could be pressed simultaneously, the potential for expansion with the simple 5-key keypad 6 is excellent. Furthermore, the keypad could be enlarged to provide different interfaces with the users. For example, a key could be added to let the shopper delete an item if he or she changes his or her mind and decides not to purchase an item already selected for purchase.

Remote Units—Electrical Power Supply

The remote unit 2 can include a rechargeable battery 9 which can be recharged through the external connection mechanism 7. When the external connection mechanism 7 is connected to an low-voltage electrical power bus, the battery 9 would be recharged. This is done as the unit 2 is stored on a central maintenance system. The battery 9 is preferably a rapidly rechargeable Ni-Cad battery such that a minimum amount of time is necessary to recharge the battery 9 for use by a shopper.

Remote Units—Input Device

Each of the remote units 2 taught by the present invention includes a data input device 8 through which the remote database memory can be updated when the unit is not being used by a shopper. The data input device communicates with the data update system through electrical connection in serial or parallel, or through other communication means such as infrared or radio transmitters and receivers. This is discussed in further detail in the description of the central maintenance system.

Remote Units: 7) Printer

The remote unit can also be used by the retail establishment clerks to identify product information errors on either shelf labels or in the information database. Error data could be stored, in the same manner as a shopper would when buying those particular items, and downloaded from these remote units 2. Furthermore, with the addition of a printer on these units they could be used to print correct and updated shelf labels for placement throughout the store.

Central Maintenance System

Storing the pricing database in each remote unit 2 allows it to operate independently of the host computer 20, a critical design feature which is a practical necessity for the system to work effectively. A data update system 21 is provided which is capable of operatively connecting to the remote unit's data input device 8 and updating the remote units 2 with updated product information related to each product bar code, such that the remote unit 2 is removable from the update system 21 for use by the shopper, and is replaceable on the update system when not being used by the shopper so as to be updated with updated product information. The update system 21 is essential to the present invention, in that, it insures that the remote units are operatively connected to the host computer 20, even though the host computer 20 and each remote unit 2 are not in constant physical connection. The update system 21 can be connected through electrical connection to a serial or parallel port in the remote unit 2, or through other communication means such as infrared or radio transmitters and receivers. For example, all the units 2 in the staging area could radiated by IR, modulated with data to be updated. The IR receivers in the units 2 could detect these signals and update the database. The communication function of the update system 21 is critical, not the exact means of data communication, as long as the update system 21 is provided with the same product price information as provided in the host computer 20. Each system also includes means for supplying the update system 21 with updated product information, including product pricing information, such that the remote units are provided with the same updated product pricing information as provided at the bar code scanners at the cashier's counters.

The means for supplying the update system 21 with product information can be provided by an intermediate computer and a host system interface between the intermediate computer and the host computer 20. A readily available IBM Personal Computer clone could be used for this purpose to reduce the difficulties of integrating the remote units 2 and the store's existing host computer 20. The host computer 20 could call up the intermediate computer 22 and provide the database to be updated on a on a convenient periodic schedule, or whenever necessary. Then the intermediate computer would perform the functions of modifying the database format, if needed, and continuously updating the remote-unit database memories, independent of the host computer's operation. It is anticipated that as the product information system develops, the means for supplying the update system with updated product information could be incorporated within the host computer operations, as opposed to an intermediate computer.

An alternate design, whereby each shopper's computer directly accesses a common database stored in a central computer, invokes numerous communications problems. Because the pricing computers must be capable of being freely carried to all areas of the supermarket floor, the only practical means of remote communication would be via RF (radio) or IR (infrared) using fixed transmitting/receiving equipment in the ceiling or the floor of the supermarket. Each remote unit would have to operate on a different frequency to avoid interference with other units being operated simultaneously. Furthermore, the systems would be susceptible to interference from other typical supermarket noise sources such as fluorescent lighting, microwave shrinkwrappers and large refrigeration equipment compressor motors. The cost of equipping the store building and each pricing computer with reliably interference free, Federal Communication Commission approved communications hardware might make the system economically unacceptable.

On the other hand, the use of IR (infrared) communications techniques could be practical for particular unit 2 functions performed in specially shielded and localized areas. For example, a group of units 2 located in a special temporary storage, or "staging", area, between customer usages could use localized IR to blanket transmit database updates to IR receivers in the units 2.

Figure 9:
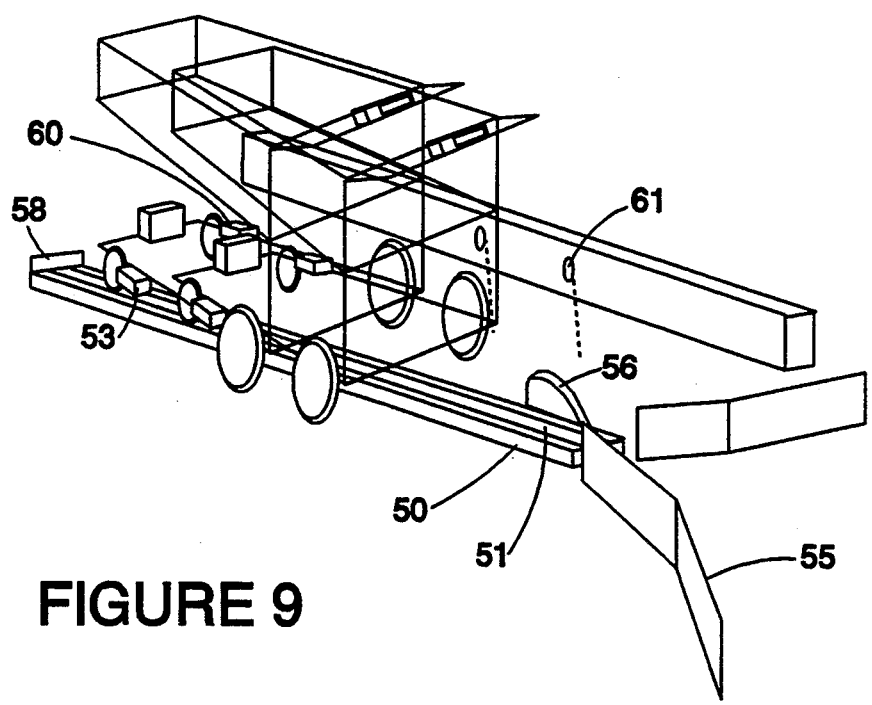
FIG. 9 is a perspective view of a shopping cart including a remote unit in a shopping cart staging area as taught by the present invention.

The maintenance system may include a staging area on the supermarket floor where groups of carts, one inside another, and equipped with remote units are placed, or it may be an automated vending machine which distributes hand-held remote units to shoppers. When the shopping cart 1 and its remote unit 2 are not being used by a supermarket customer, the cart 1 will be stored along with other carts in a staging area, similar to the cart storage method used by supermarkets today. FIG. 9 is a perspective view of a shopping cart including a remote unit in a shopping cart staging area as taught by the present invention.

While in the staging area, the battery inside the remote units is recharged through an external connection mechanism which is connected to an electrical power bus. Also, while in the staging area, the product information database updating function for updating the product information stored in the memory of the remote units could also be performed.

The staging area could be equipped with floor rails 50 containing parallel electrical contact strips 51 through which power for recharging the batteries 9 and data for updating the pricing database in the computer 3 memory can be transferred to an external connection mechanism 7 on the shopping cart 1. The mechanism 7 is mounted on the lower frame of the cart 1 and connected to the unit 2 via a cable 52. The active element of the mechanism 7 is a spring-loaded electrical conductor 53 that interfaces with the geometry of the contact strips 51 in the floor rail 50 and slides smoothly along the rail 50 when the cart is properly aligned with the rail 50.

The conductor in the mechanism 7 is raised up against its spring and surrounded by a housing 54 that protects it from dirt and debris when the cart 1 is being used by a shopper. As a cart 1 or group of carts 1 inside each other are wheeled toward the staging area, additional guide rails 55 on the floor funnel the carts into alignment with the contact strip floor rail 50. A cam 56 fixed to the floor releases a detente pin in the mechanism 7 on the cart as the cart passes over it, allowing the conductor 53 in the mechanism 7 to move down and mesh with the rail 50. The spring force behind the mechanism 7 keeps it in good electrical contact with the rail 50. Carts 1 are removed from the staging area on a first-in first-out basis. A foot pedal 57 mounted on the mechanism housing is depressed to raise the mechanism's conductor 53 back up into its housing 54 where the spring-loaded detente pin retains it. A block 58 at the end of the floor rail 50 prevents carts 1 from being wheeled past the end of the rail 50 until the mechanism conductor 53 has been raised.

Figure 10A:
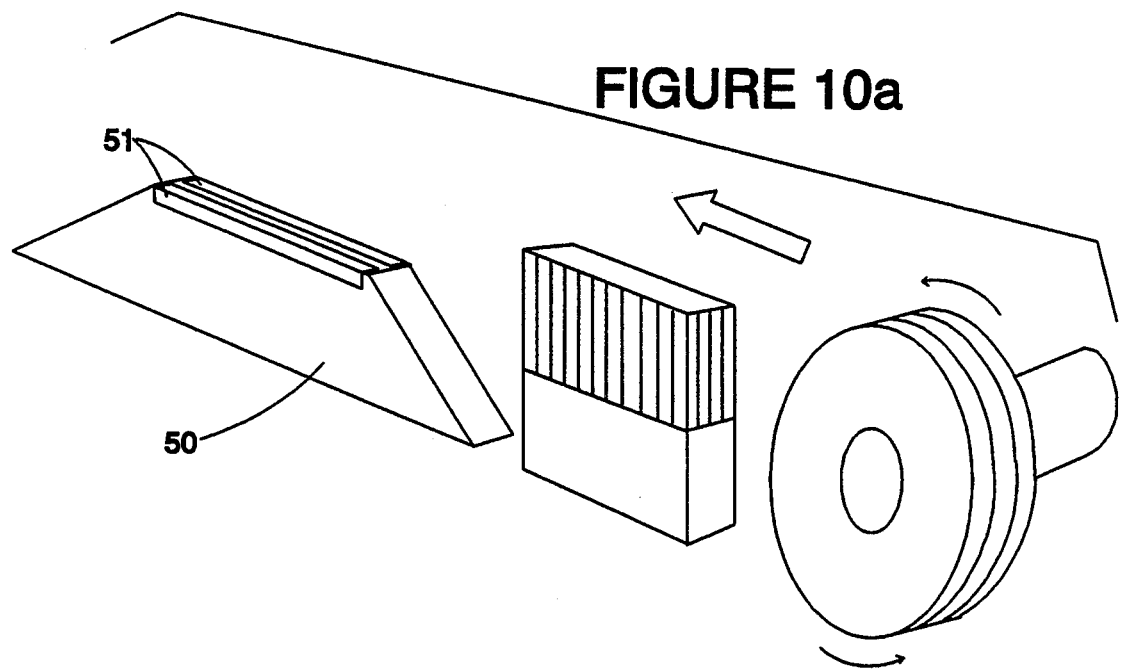
FIGS. 10a and 10b are a perspective view and a cross-sectional view of one embodiment for an external connection mechanism for a remote unit attached to a shopping cart as taught by the present invention.
Figure 10B:
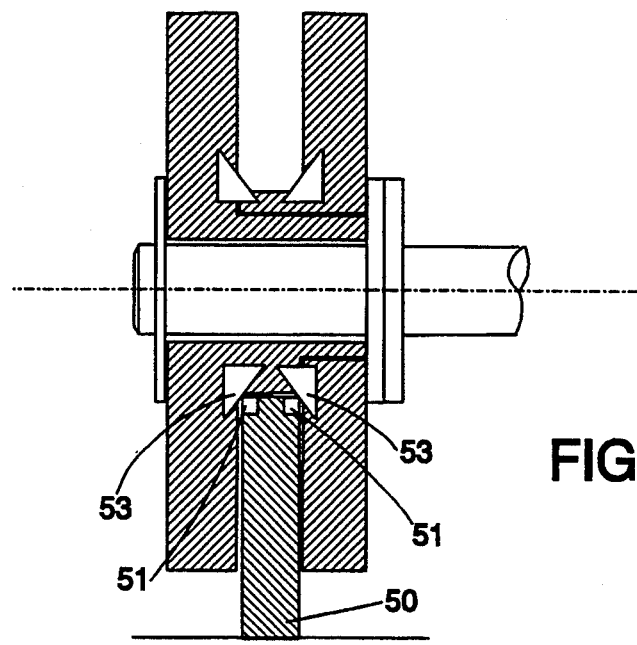

An alternate and preferred battery recharging mechanism includes one where the charging conductors 53 could be provided within the wheels of the cart 1, as shown in FIGS. 10a and 10b. The cart 1 would be pushed up onto the rail 50 such that the conductor 53 made a good connection with the rail 50. The rail 50 is high enough such that the wheel would ride on the rail 50 as opposed to the floor. The weight of the cart 1 would insure the positive connection between the connector 53 and the rail 50.

Figure 11:
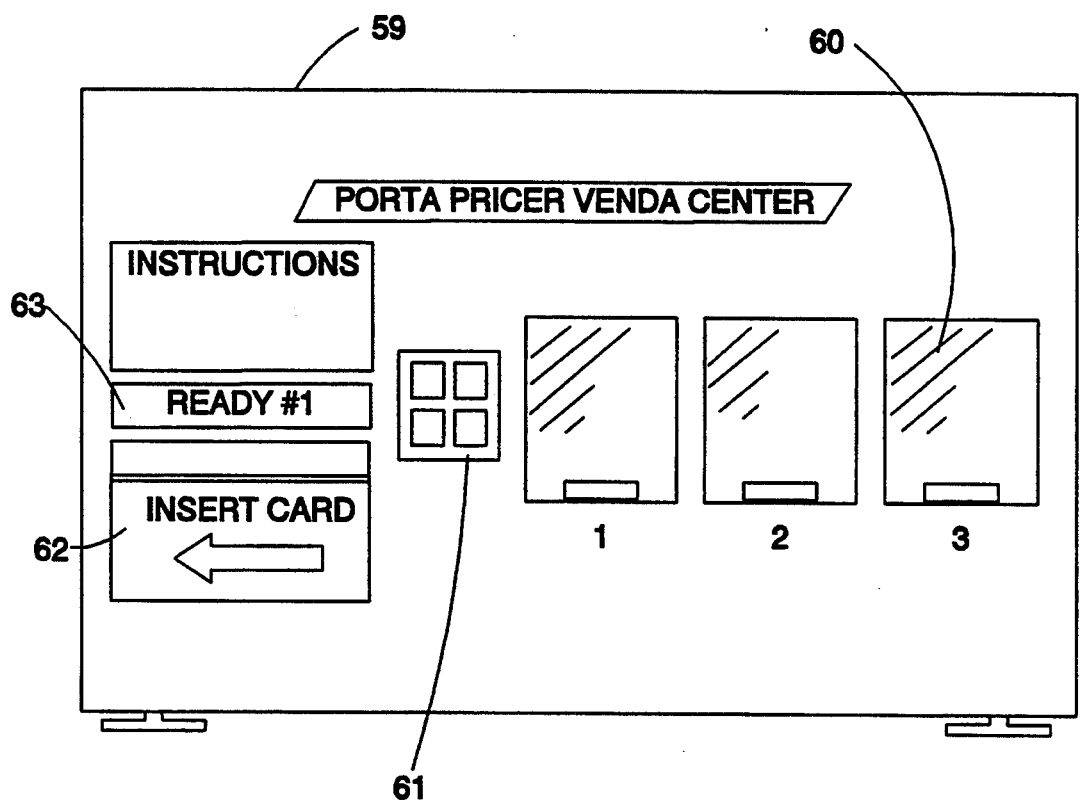
FIG. 11 is a front view of a staging area for portable remote shopper carried units.
Figure 12:
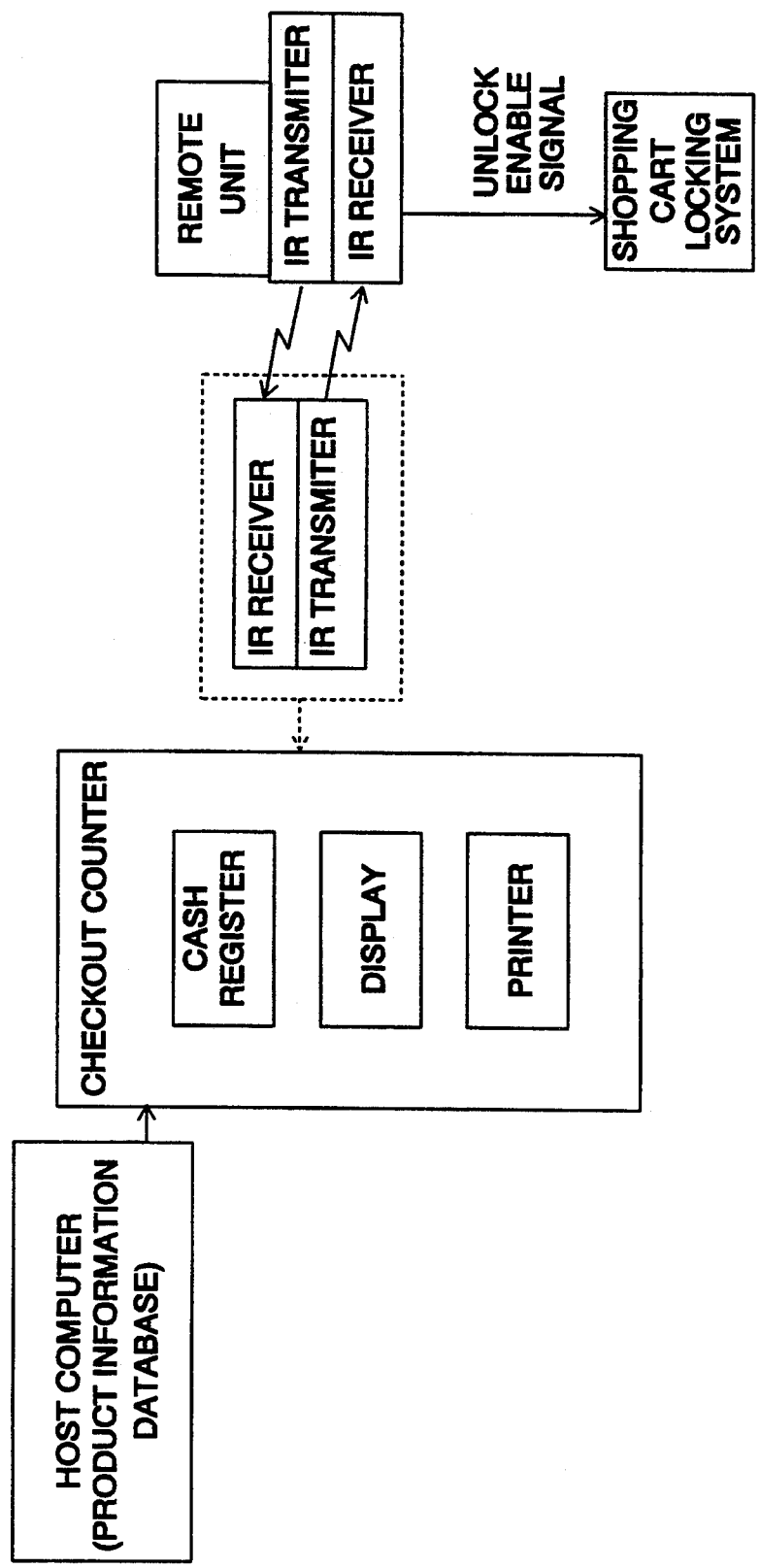
FIG. 12 is a block diagram of a checkout counter system as taught by the present invention

FIG. 11 is a front view of a staging area 59 for portable remote shopper carded units. The shopper carried unit would be stored within the dispensing doors 60. The units 2 are connected to the data update system when they are stored in the staging area 59. The shopper would punch in an identification number through a keypad 61 and/or slide an identification card through an ID card reader 62 before a remote unit would be allowed to be removed. An appropriate gate will automatically open, allowing the customer to pick tip only one remote unit 2. Such techniques have been widely used in the vending machine industry. By this technique, the customer would assume responsibility for the loaned unit 2. When the unit 2 is returned at the checkout station, the customer's name, and responsibility, would be cleared from the record of units outstanding. A large number of units 2 can be stored in several parallel racks in the staging area 59. Because dispensing to the customer is automated, the only labor required by supermarket personnel to keep the system going is to periodically bring the returned units from the checkout stations back to the staging area 59. And even this could be automated.

Because good uninterrupted mechanical contact is necessary to insure error-free transmission of data through an electrical contact, the alternate use of blanket IR or RF transmissions of data to the remote units 2 in either type of staging area is preferred for greater reliability. As shown in FIG. 9, an IR receiver 70 can be included within the remote unit 2 such that IR signals from an IR transmitter 71 can be received. The IR transmitters 71 are connected to the main system bus and the IR receivers 70 would function as the data input device 8.

Checkout Counter

The shopper can keep track of the products placed in the cart on the remote unit 2 until he or she has reached the cashier's counter. At the cashier's counter the products to be purchased will be scanned by the cashier's scanner and totaled. It is possible that there will be a discrepancy between the cashier's total and the remote unit's total. The most likely cause for this discrepancy within the present system is user error, i.e. a product was added twice or was not included in the total. In some embodiments of the present invention the product information system may include a remote unit interface for the bar code scanner at the cashier's counter, as shown in the block diagram of FIG. 12. The running total of products information stored in the remote unit can be compared to information totaled at the bar code scanner at the cashier's counter and the discrepancies identified. This interface could be provided by an electrical connection or an IR or RF communication interface.

Figure 13:
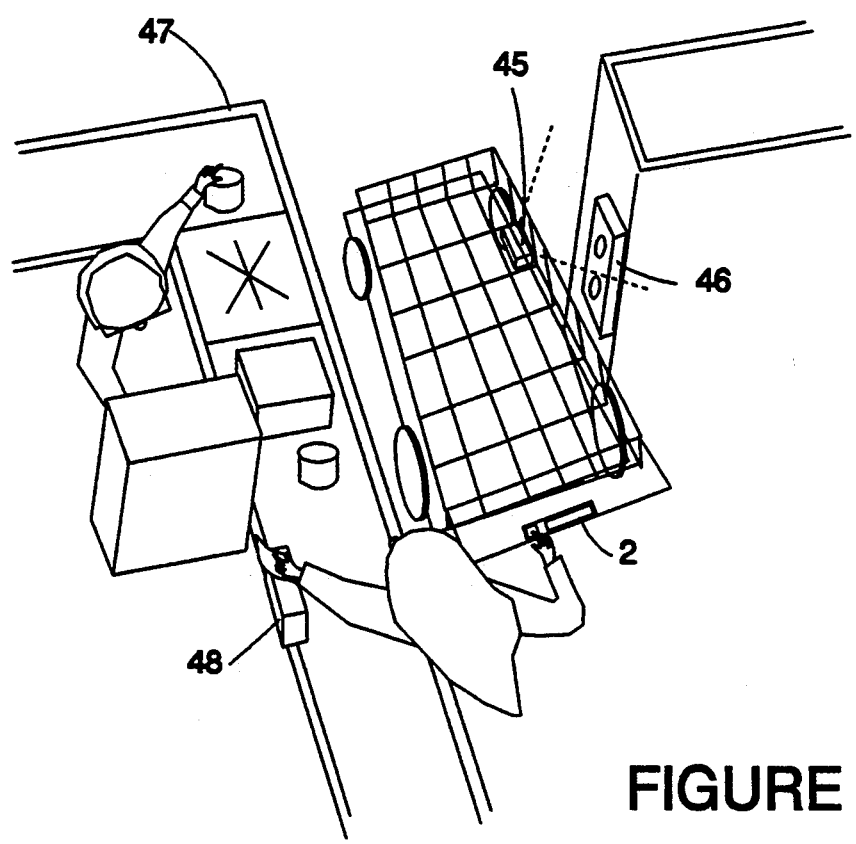
FIG. 13 is a perspective view of a shopper using an interface between the remote unit computer and the cashier's scanner computer to compare the shopper's list of product's purchased and the cashier's list of products purchased.

FIG. 13 is a perspective view of a shopper using an interface between the remote unit computer and the cashier's scanner computer to compare the shopper's list of product's purchased and the cashier's list of products purchased. The remote unit 2 includes an IR transmitter 45 which transmits signals to an IR receiver 46 which is connected to the checkout counter's computer 47. The product list and information (i.e. nutritional information) could be printed out on a printer 48. While a printer could be included in the remote unit 2, the advantage of including the printer 48 at the checkout counter computer 47 is the lack of excessive printouts and littering throughout the store. While an IR interface is shown, many other types of communications interfaces can be used as long as the communication between the remote unit 2 and the cashier's counter computer 47 is accomplished.

Security

Since these shopper units are expected to be a valuable item, it is desirable that these units do not go out the retail establishment in an unauthorized manner. Security measures to discourage theft of the remote units could include mechanical restrictions on carts, to which remote units are attached, to prevent the carts from being taken out of the store. Or, as a courtesy to shoppers, the mechanical restrictions on the carts could be removed at supermarket checkout stations when a key component of the remote units was removed from the temporary storage rack on the cart. Also, a magnetic strip molded into the case of the remote unit could be provided to set off an alarm if the remote unit were to pass through a strip sensor at the exits of the supermarket. In addition, security can be enhanced by requiring the customer to register his name and personal information when borrowing a remote unit. A customer's credit card, check-cashing card or similar card with a standard magnetic data strip would be inserted in a center maintenance system card reader and the shopper's data entered into a temporary loan file in the intermediate computer before the customer could take a unit from the central maintenance system.

The distribution of hand held units is limited to only authorized shoppers who sign out for them. The sign out could be automated by the used of a card issued permanently to that shopper by the store, such as a check cashing card. The sign-in could be registered at the checkout counter by the sales clerk. The automated use of credit cards for sign-out is well known to those skilled in the art. Furthermore, a vending machine could be provided where the portable shopper units are stacked and then individually delivered to each shopper upon the insertion of an appropriate card issued by the retail establishment. Furthermore, the functions of the data update and battery recharging of the remote units is also integrated in the vending machine. Coin operated systems for dispersal of carts have been widely used in airports. These cart dispersal systems could be easily modified to dispense cart mounted units as taught by the present invention.

There may be several shoppers who do not have enough credit history with that retail establishment and therefore cannot be entrusted with the hand held units. Such shoppers can be provided with the shopping cart mounted units and the shopping carts could be restricted from leaving the retail establishment through the use of posts around the retail establishment. Such use of posts to prevent the removal of shopping carts from the retail store is quite well known and wide spread. However, some customers may still desire the convenience of taking the cart out to the car in the parking lot for unloading their groceries. So one may use two different size shopping carts. Carts containing the shopper units can be larger sized and physically prevented from going out through the guard posts. The merchandise could be transferred from the larger carts to smaller carts, without the remote units, after bagging. The guard post size would be such that it allows these smaller sized carts out into the parking lots. This approach, however, has an undesirable effect of transferring merchandise from one cart to the other. Another approach taught by the present invention includes the use of the housing of the shopper's unit and its fastening to a shopping cart. As a preferred embodiment, the present invention teaches that the physical housing of the shopper's units are fastened to the shopping cart in such a way that the net effect is increasing the physical size of the shopping cart which can not physically pass through the guard posts. The shopper's unit is removed from the shopping cart and the holder collapsed, to allow the shopping cart to be taken to the shopping area, instead of transferring the merchandise into a different cart.

Electronic means, IR or RF, could be provided to unlatch the shopper's unit from the cart. The unlatching signals could be complex and encrypted such that the removal of the shopper's computer from the shopping cart could only be performed by the agents of the retail establishment. The use of RF signals to physically latch garage doors has been in public use for several decades. The use of encryption technology using some sort of pt, bile key to code the unlatching signals can easily be implemented by those skilled in the art. The use of encryption in unlatching signals provide the safety from those who can monitor the unlatching signals for a while and use them to unlatch the shoppers unit from the cart and walk away with it.

The retrieval function of the remote unit could be integrated with each of the existing checkout counters or by forming a separate checkout counter means for unit retrieval. The remote unit is retrieved from the shopper by the clerk at the checkout counter and returned to the central maintenance system for updating and recharging. If the customer has used a magnetic-strip identification card to obtain a remote unit at the staging area, he or she may remove his or her name and data from the load file in the temporary database by passing his or her card through a checkout card reader after the remote unit has been returned. After the unit is received from the shopping cart, it is secured on the another cart and sent on the staging area for maintenance, including data update and recharge.

The theft potential could further be reduced by a combination of magnetic security strips molded into the computer case and controlled distribution of the units to the customer. Commercially available magnetic security strips similar to those used on books in public libraries have no effect on the computer's volatile memory and are effective for tip to twenty years. The store would have to install appropriate detectors in the store doorways to implement this system, but, once installed, the detectors could be used to curb theft of other items as well as the pricing computers.

A number of embodiments for implementing the teachings of the present invention have been described hereinabove. It is anticipated that the specific implementations of the teachings of the present invention will be selected based upon the specific application of the system. For example, a food store in a metropolitan area may be more concerned with securing the remote units to shopping carts, than a food store in a rural area which might provide hand-held units for shopper convenience.

The pricing method of the present invention displays to the shopper the current prices in the cashier's counter computer database, therefore there are no discrepancies. In addition, this method provides individual product pricing information without physically affixing price labels, so the industry has its desired labor cost savings without depriving shoppers of their desired services. As shown in FIGS. 1–13, a dedicated portable microcomputer designed to provide the customer on the supermarket floor the ability to scan the bar codes on product packages and to display the database price for the item scanned, is taught herein.

As shown in FIG. 1, the present invention teaches a product information system for providing a shopper with current, accurate information on individual products within a retail establishment which uses bar code scanners at cashier's counters to record products of the shopper's purchase. The product information system includes a plurality of portable remote product information units to be provided for each of the shoppers within the establishment who desire access to the product information. As shown in FIG. 2, each of the remote units includes: 1) a bar code scanning device capable of decoding bar codes on individual products, 2) a microcomputer with database memory capable of storing and retrieving updatable product information related to each of the bar codes, 3) means for displaying the product information to the shopper, 4) means for providing the shopper with limited user-function control of the microcomputer, including manipulation of selected product information, 5) means for supplying the unit with electrical power, and 6) an input device through which the database memory can be updated. The product information system also includes a data update system capable of operatively associating with the input device and updating the remote units with updated product information related to each of the bar codes, such that the remote units are removable from the data update system for use by the shopper, and are restorable on the data update system after use by the shopper so as to be updated with the updated product information. The data update system is connected to means for supplying the data update system with updated product information, including product pricing information, such that the remote units are provided with the same updated product pricing information as provided at the bar code scanners at the cashier's counters.

Each remote unit can include a rechargeable battery for supplying electrical power to the unit and an external connection mechanism. The product information system can include an electrical power bus such that the remote unit external connection mechanism is connected to the electrical power bus and the rechargeable battery is recharged through the external connection mechanism while the unit is not being used by the shopper. A staging area is shown wherein each remote unit is stored when not being used by the shopper such that the input device of the remote unit associates with the data update system and the external connection mechanism is connected to the electrical power bus when the remote unit is replaced in the staging area and is updated with product information and the rechargeable battery is recharged as the remote unit is stored at the staging area. The staging area can include rails containing electrical strips through which power for recharging the rechargeable battery in the remote units is provided through the external connection mechanism of the remote unit. The staging area can include means for assuring that the remote units are not removed before the remote units have been updated with updated product information. The product information system can incorporate the data update system and the electrical power bus in a central maintenance system.

The data update system can include an RF or IR transmitter and each of the remote units can include an appropriate RF or IR receiver for receiving signals from the transmitter such that the data update system updates the remote units with update product information through operative transmission and reception between the transmitter and receiver. The remote units can also include means for being secured to a shopping cart such that the unit can be easily used by the shopper, but can only be removed from the shopping cart by agents of the retail establishment. The remote units can include means for securing the remote unit such that the unit can be easily used by the shopper, but can only be removed from the retail establishment by agents of the retail establishment. The means for securing the remote unit could be electronically controlled such that the securing means can only be deactivated by agents of the retail establishment when an appropriate deactivation signal is provided.

The means for providing the shopper with limited user-function control of the microcomputer, including manipulation of selected product information, can allow the shopper to keep a running total and list of products intended for purchase. A remote unit interface for the bar code scanner at the cashier's counter can be provided such that the running total and list of products intended for purchase stored in the remote unit can be compared to information recorded at the bar code scanner at the cashier's counter so that any discrepancies between the information stored in the remote unit and the information recorded at the bar code scanner as the cashier's counter are identified. Furthermore, a remote unit could include a printer apparatus through which product information can be printed. This remote unit including the printer apparatus can be used by an agent of the retail establishment to print shelf labels identifying individual product pricing information so that the shelf labels can be positioned in appropriate locations throughout the retail establishment.

A central maintenance system is taught for maintaining a plurality of portable remote product information units, that are provided for shoppers within a retail establishment which uses bar code scanners at cashier's counters to record products of the shopper's purchase, wherein the remote units include a bar code scanning device capable of scanning bar codes on individual products, a microcomputer with database memory capable of storing and retrieving updatable product information related to each of the bar codes, a rechargeable battery for supplying electrical power to the unit and an external connection mechanism through which the rechargeable battery can be recharged, and an input device through which the database memory can be updated. The central maintenance system comprises: a data update system capable of operatively associating with the input device on the remote units and updating the remote units with updated product information related to each of the bar codes, such that the remote units are removable from the data update system for use by the shopper, and are restorable on the data update system after use by the shopper so as to be updated with the updated product information, including product pricing information, such that the remote units are provided with the same updated product pricing information as provided at the bar code scanners at the cashier's counters; and an electrical power bus capable of operatively connecting to the remote unit external connection mechanism and recharging the rechargeable battery through the external connection mechanism.

The teachings of the present invention include a checkout counter system to operate in conjunction with a bar code scanner at a cashier's counter in a retail establishment capable of recording information related to products to be purchased by reading bar codes affixed to the products. The checkout counter system comprises: a data interface system for receiving information from a remote unit such that a product information, including pricing information, related to a list of products intended for purchase stored in the remote unit can be recorded in the checkout counter system; and means are provided for comparing the information recorded at the bar code scanner at the cashier's counter and the information received from the remote unit so that any discrepancies between the information received from the remote unit and the information recorded at the bar code scanner as the cashier's counter are identified. The checkout counter system can further include a remote unit interface such that a signal can be provided to the remote unit which deactivates a securing mechanism such that the remote unit can be retrieved from the shopper.

The teachings of the present invention include a method of providing shoppers with current, accurate information on individual products within a retail establishment which uses bar code scanners at cashier's counters to record products of the shopper's purchase. A plurality of portable remote units are provided for each of the shoppers within the establishment who desire access to the product information. Each of the remote units include: 1) a bar code scanning device capable of decoding bar codes on individual products, 2) a microcomputer with database memory capable of storing and retrieving updatable product information related to each of the bar codes, 3) means for displaying the product information to the shopper, 4) means for providing the shopper with limited user-function control of the microcomputer, including manipulation of selected product information, 5) means for supplying the remote unit with electrical power, and 6) an input device through which the database memory can be updated when the unit is not being used by the shopper. The remote units are retrieved from each of the shoppers subsequent to a finished purchase. The remote units are updated with updated product information, including product pricing information, through the input device, such that the bar code scanners at the cashier's counters and the remote units are provided with exactly the same updated product pricing information. The updated remote units are then provided for further use by the shoppers. The means for supplying electrical power to the unit could be provided by a rechargeable battery and an external connection mechanism through which the rechargeable battery can be recharged. The method can further include storing a list of product information, including pricing information, related to product intended for purchase in the remote unit during use by the shopper and comparing the list of product information stored in the remote unit to product information, including pricing information recorded by the bar code scanner at the cashier's counter and identifying any discrepancies between the information stored in the remote unit and the information recorded at the bar code scanner at the cashier's counter.

The teachings of the present invention further include a method of using a portable remote bar code scanning unit including, a bar code scanning device capable of decoding bar codes, a microcomputer with database memory capable of storing and retrieving updatable product information related to each of the bar codes, means for displaying the product information, means for providing the shopper with limited user-function control of the microcomputer, means for supplying the unit with electrical power, and an input device through which the database memory can be updated. The new use comprises: providing the remote unit to shoppers within a retail establishment which uses bar code scanners at cashier's counters to record products of the shopper's purchase; retrieving the remote units from each of the shoppers subsequent to a finished purchase; updating the remote units with at least updated pricing information such that the bar code scanners at the cashier's counters and the remote units are provided with the same updated product pricing information; and providing the updated, recharged remote units for further use by the shoppers. The new use can further include storing a list of product information, including pricing information, related to product intended for purchase in the remote unit during use by the shopper and comparing the list of product information stored in the remote unit to product information, including pricing information recorded by the bar code scanner at the cashier's counter and identifying any discrepancies between the information stored in the remote unit and the information recorded at the bar code scanner at the cashier's counter.

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications.

We claim:

1. A product information system for providing a shopper with current, accurate information on individual products within a retail establishment which uses bar code scanners at cashier counters and upon individual, stand-alone portable, remote product information units under shopper control, to record shopper purchases, wherein said product information system comprises:
   a) a plurality of stand-alone, portable, remote product information units, each unit being updatable with information from a remote source concerning each product within said retail establishment, each of said units to be provided for each of said shoppers within said establishment who desire access to said product information as they traverse said establishment, each of said remote, stand-alone units including:
      i) a bar code scanning device operatively connected to a microcomputer and capable of decoding bar codes on individual products,
      ii) a microcomputer with database memory capable of storing and retrieving updatable product information related to each bar code of a product scanned by a shopper using said bar code scanning device to obtain product information,
      iii) means for displaying said product information to said shopper, and operatively connected to said microcomputer,
      iv) control means operatively connected to said microcomputer for providing each shopper with limited user-function control of said microcomputer, including manipulation of selected product information,
      v) power supply means for supplying each remote product information unit with electrical power, and
      vi) an input device operatively connected to said microcomputer through which said database memory can be updated;
   b) a data update system operatively associated with each of said input devices of said plurality of stand-alone, portable, remote product information units for updating said stand-alone, portable, remote product information units with updated product information related to each of said bar codes, such that said stand-alone, portable, remote product information units are removable from said data update system for use by respective shoppers, and are restorable on said data update system after use by said shoppers so as to be updated with said updated product information; and
   c) means for supplying said data update system with updated product information, including product pricing information, such that said stand-alone, portable, remote product information units are provided with the same updated product pricing information as provided at said bar code scanners at said cashier counters.

2. A product information system of claim 1 wherein each of said remote units further includes means for being secured to a shopping cart such that said unit can be easily used by said shopper, but can only be removed from said shopping cart by agents of said retail establishment.

3. A product information system of claim 1 wherein each of said remote units further includes means for securing said remote unit such that said unit can be easily used by said shopper, but can only be removed from said retail establishment by agents of said retail establishment.

4. A product information system of claim 1 wherein each of said remote units further includes electronically controlled means for securing said remote unit such that said unit can be easily used by said shopper, and said securing means can only be deactivated by agents of said retail establishment when an appropriate deactivation signal is provided.

5. A product information system of claim 1, wherein each remote unit further includes a rechargeable battery for supplying electrical power to said unit and an external connection mechanism, and said product information system includes an electrical power bus such that when said remote unit external connection mechanism is connected to said electrical power bus, said rechargeable battery is recharged through said external connection mechanism.

6. A product information system of claim 5 further comprising a staging area wherein each remote unit is stored when not being used by said shopper such that said input device of said remote unit associates with said data update system and said external connection mechanism is connected to said electrical power bus when said remote unit is placed in said staging area and is updated with product information and said rechargeable battery is recharged as said remote unit is stored at said staging area.

7. A product information system of claim 6, wherein said staging area includes rails containing electrical strips through which power for recharging said rechargeable battery in said remote units is provided through said external connection mechanism of said remote unit.

8. A product information system of claim 6, wherein said data update system includes an RF or IR transmitter and each of said remote units includes an appropriate RF or IR receiver for receiving signals from said transmitter such that said data update system updates said remote units with updated product information through operative transmission and reception between said transmitter and receiver.

9. A product information system of claim 6, wherein said staging area includes means for assuring that said remote units are not removed before said remote units have been updated with updated product information.

10. A product information system of claim 1, wherein said means for providing said shopper with limited user-function control of said microcomputer, including manipulation of selected product information, allows said shopper to keep a running total and list of products intended for purchase.

11. A product information system of claim 10, further comprising a remote unit interface for said bar code scanner at said cashier's counter such that said running total and list of products intended for purchase stored in said remote unit can be compared to information recorded at said bar code scanner at said cashier's counter so that any discrepancies between the information stored in said remote unit and the information recorded at said bar code scanner as said cashier's counter are identified.

12. A product information system of claim 11, wherein said data update system includes an RF or IR transmitter and each of said remote units includes an appropriate RF or IR receiver for receiving signals from said transmitter such that said data update system updates said remote units with updated product information through operative transmission and reception between said transmitter and receiver.

13. A product information system of claim 1, wherein at least one remote unit includes a printer apparatus through which product information can be printed.

14. The product information system of claim 13, wherein said retail establishment remote product information unit can be used by an agent of said retail establishment to print shelf labels in an appropriate format identifying individual product information, including pricing information and corresponding bar codes, so that said shelf labels can be positioned in appropriate locations throughout said retail establishment.

15. A product information system for providing a shopper with current, accurate product information on individual products within a retail establishment which uses bar code scanners at cashier counters to record shopper purchases, said product information system comprising:
 a) a plurality of stand-alone, portable, remote product information units, one of which is to be provided for each of said shoppers within said establishment who desire access to said product information, each of said stand-alone, portable remote product information units including:
  i) a bar code scanning device capable of decoding bar codes on individual products,
  ii) a microcomputer operatively connected to said bar code scanning device and having database memory capable of storing and retrieving updatable product information related to each bar code,
  iii) means for displaying said product information to said shopper, and operatively connected to said microcomputer,
  iv) control means operatively connected to said microcomputer for providing each shopper with limited user-function control of said microcomputer, including manipulation of selected product information,
  v) a rechargeable battery operatively connected to and supplying electrical power to said stand-alone, portable, remote product information unit through an external connection mechanism by which said rechargeable battery can be recharged, and
  vi) an input device operatively connected to said microcomputer through which said database memory can be updated;
 b) a central maintenance system, including:
  i) a data update system operatively associated with each of said input devices of said plurality of stand-alone, portable, remote product information units for updating said stand-alone, portable, remote product information units with updated product information related to each of said bar codes, such that said stand-alone, portable, remote product information units are removable from said data update system for use by respective shoppers, and are restorable on said data update system after use by said shoppers so as to be updated with said updated product information, said data update system further comprising means for assuring that each of said stand-alone, portable, remote product information units is not removed from said data update system before it has been updated with updated product information; and
  ii) an electrical power bus operatively connecting to said stand-alone, portable, remote product information unit through an external connection mechanism, said electrical power bus providing means by which said rechargeable battery of said stand-alone, portable, remote product information unit can be recharged; and
 c) means for supplying said data update system with updated product information, including product pricing information, such that said stand-alone, portable, remote product information units are provided with the same updated product pricing information as provided at said bar code scanners at said cashier counters.

16. A product information system of claim 15 wherein each of said remote units further includes means for being secured to a shopping cart such that said unit can be easily used by said shopper, but can only be removed from said shopping cart by agents of said retail establishment.

17. A product information system of claim 15 wherein each of said remote units further includes means for securing said remote unit such that said unit can be easily used by said shopper, but can only be removed from said retail establishment by agents of said retail establishment.

18. A product information system of claim 15 wherein each of said remote units further includes electronically controlled means for securing said remote unit such that said unit can be easily used by said shopper, and said securing means can only be deactivated by agents of said retail establishment when an appropriate deactivation signal is provided.

19. A product information system of claim 15, wherein said central maintenance system includes rails containing electrical strips through which power for recharging said rechargeable battery in said remote units is provided through said external connection mechanism of said remote unit.

20. A product information system of claim 15, wherein said data update system includes an RF or IR transmitter and each of said remote units includes an appropriate RF or IR receiver for receiving signals from said transmitter such that said data update system updates said remote units with update product information through operative transmission and reception between said transmitter and receiver.

21. A product information system of claim 15, wherein said means for providing said shopper with limited user-function control of said microcomputer, including manipulation of selected product information, allows said shopper to keep a running total and list of products intended for purchase.

22. A product information system of claim 21, further comprising a remote unit interface for said bar code scanner at said cashier's counter such that said running total and list of products intended for purchase stored in said remote unit can be compared to information recorded at said bar code scanner at said cashier's counter so that any discrepancies between the information stored in said remote unit and the information recorded at said bar code scanner as said cashier's counter are identified.

23. A product information system of claim 22, wherein said data update system includes an RF or IR transmitter and each of said remote units includes an appropriate RF or IR receiver for receiving signals from said transmitter such that said data update system updates said remote units with updated product information through operative transmission and reception between said transmitter and receiver.

24. A product information system of claim 15, wherein at least one of said remote units includes a printer apparatus through which product information can be printed.

25. The product information system of claim 23, wherein said retail establishment remote product information unit can be used by an agent of said retail establishment to print shelf labels in an appropriate format identifying individual product information, including pricing information and corresponding bar codes, so that said shelf labels can be positioned in appropriate locations throughout said retail establishment.

26. A central maintenance system for maintaining a plurality of stand-alone, portable, remote product information units that are provided for shoppers within a retail establishment which uses bar code scanners at cashier counters to record shopper purchases, wherein, said stand-alone, portable, remote product information units include a bar code scanning device for decoding bar codes on individual products, a microcomputer operatively connected to said bar code scanning device having a database memory for storing and retrieving updatable product information related to each of said bar codes, a rechargeable battery operatively connected to said microcomputer for supplying electrical power thereto, an external connection mechanism operatively connectable to said rechargeable battery, and through which said rechargeable battery can be recharged, and an input device operatively connected to said microcomputer through which said database memory can be updated, said central maintenance system further comprising:

a) a data update system operatively associated with each of said input devices of said plurality of stand-alone, portable, remote product information units for updating said stand-alone, portable, remote product information units with updated product information related to each of said bar codes, such that said stand-alone, portable, remote product information units are removable from said data update system for use by respective shoppers, and are restorable on said data update system after use by said shoppers so as to be updated with said updated product information, including product pricing information, such that said stand-alone, portable, remote product information units are provided with the same updated product information as provided at said bar code scanners at said cashier counters, said data update system further comprising means for assuring that each of said stand-alone, portable, remote product information units is not removed from said data update system before it has been updated with updated product information, and b) an electrical power bus operatively connecting to said stand-alone, portable, remote product information unit through an external connection mechanism, said electrical power bus providing means by which said rechargeable battery of said stand-alone, portable, remote product information unit can be recharged.

27. A checkout counter system to operate in conjunction with a bar code scanner at a cashier's counter in a retail establishment capable of recording information related to products to be purchased by reading bar codes affixed to said products, comprising:

a) a data communications interface system for receiving information from a remote unit such that product information, including pricing information, related to a list of products intended for purchase stored in said remote unit can be retrieved in said checkout counter system;

b) means for comparing said information recorded at said bar code scanner at said cashier's counter and said information retrieved from said remote unit so that any discrepancies between said information received from said remote unit and said information recorded at said bar code scanner at said cashier's counter are identified.

28. A checkout counter system of claim 27, further including a remote unit securing system unlatching system for said bar code scanner at said cashier's counter such that a signal can be provided to said remote unit which deactivates a securing mechanism such that said remote unit can be retrieved from said shopper.

29. A method of providing shoppers with current, accurate information on individual products within a retail establishment which uses bar code scanners at cashier's counters to record products of said shopper's purchase, wherein said method comprises the steps of:

a) providing a plurality of stand-alone, portable remote units for each of said shoppers within said establishment who desire access to said product information, each of said remote units, including:
  1) a bar code scanning device capable of decoding bar codes on individual products,
  2) a microcomputer with database memory capable of storing and retrieving updatable product information related to each of said bar codes;
  3) means for displaying said product information to said shopper,
  4) means for providing said shopper with limited user-function control of said microcomputer, including manipulation of selected product information,
  5) means for supplying said remote unit with electrical power, and 6) an input device through which said database memory can be updated when said unit is not being used by said shopper;

b) retrieving said remote units from each of said shoppers subsequent to a finished purchase;

c) updating said remote units with updated product information, including product pricing information, through said input device, such that said bar code scanners at said cashier's counters and said remote units are provided with exactly the same updated product pricing information; and d) providing said updated remote units for further use by said shoppers.

30. A method of providing shoppers with current, accurate information on individual products within a retail establishment which uses bar code scanners at cashier's counters to record products of said shopper's purchase, wherein said method comprises the steps of:

a) providing a plurality of stand-alone, portable remote units for each of said shoppers within said establishment who desire access to said product information, each of said remote units, including:

1) a bar code scanning device capable of decoding bar codes on individual products, 2) a microcomputer with database memory capable of storing and retrieving updatable product information related to each of said bar codes;

3) means for displaying said product information to said shopper, 4) means for providing said shopper with limited user-function control of said microcomputer, including manipulation of selected product information, 5) a rechargeable battery for supplying electrical power to said unit and an external connection mechanism through which said rechargeable battery can be recharged, and 6) an input device through which said database memory can be updated when said unit is not being used by said shopper;

b) retrieving said remote units from each of said shoppers subsequent to a finished purchase;

c) updating said remote units with updated product information, including product pricing information, through said input device, such that said bar code scanners at said cashier's counters and said remote units are provided with exactly the same updated product pricing information;

d) recharging said rechargeable batteries through said extension mechanism; and e) providing said updated, recharged remote units for further use by said shoppers.

31. The method of claim 30 wherein each of said remote units is secured to a shopping cart such that said unit can be easily used by said shopper, but can only be removed from said shopping cart by agents of said retail establishment.

32. The method of claim 31, further comprising securing said remote units such that each of said units can be easily used by said shoppers, but can only be removed from said retail establishment by agents of said retail establishment.

33. The method of claim 31, further comprising securing said remote units with electronically controlled means for securing said remote unit such that said unit can be easily used by said shopper, and said securing means can be deactivated by agents of said retail establishment when an appropriate deactivation signal is provided.

34. The method of claim 31, wherein each of said remote units are provided with an RF or IR receiver for receiving signals from a transmitter such that said remote units are updated with update product information through operative transmission and reception between said transmitter and receiver.

35. The method of claim 31 further comprising storing a list of product information, including pricing information, related to product intended for purchase in said remote unit during use by said shopper and comparing said list of product information stored in said remote unit to product information, including pricing information recorded by said bar code scanner at said cashier's counter and identifying any discrepancies between said information stored in said remote unit and said information recorded at said bar code scanner at said cashier's counter.

36. A method of using a stand-alone, portable remote bar code scanning unit including, a bar code scanning device capable of decoding bar codes, a microcomputer with database memory capable of storing and retrieving updatable product information related to each of said bar codes, means for displaying said product information, means for providing said shopper with limited user-function control of said microcomputer, means for supplying said unit with electrical power, and an input device through which said database memory can be updated, wherein said new use comprises:

a) providing said remote unit to shoppers within a retail establishment which uses bar code scanners at cashier's counters to record products of said shopper's purchase;

b) retrieving said remote units from each of said shoppers subsequent to a finished purchase;

c) updating said remote units with at least updated pricing information such that said bar code scanners at said cashier's counters and said remote units are provided with the same updated product pricing information; and d) providing said updated, recharged remote units for further use by said shoppers.

37. The method of claim 36 further comprising storing a list of product information, including pricing information, related to product intended for purchase in said remote unit during use by said shopper and comparing said list of product information stored in said remote unit to product information, including pricing information recorded by said bar code scanner at said cashier's counter and identifying any discrepancies between said information stored in said remote unit and said information recorded at said bar code scanner at said cashier's counter.

* * * * *